(12) United States Patent
Takeda et al.

(10) Patent No.: US 11,706,774 B2
(45) Date of Patent: Jul. 18, 2023

(54) DOWNLINK CONTROL INFORMATION FOR SCHEDULING MULTIPLE COMPONENT CARRIERS

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US); Huilin Xu, Temecula, CA (US); Wanshi Chen, San Diego, CA (US); Tao Luo, San diego, CA (US); Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/192,719

(22) Filed: Mar. 4, 2021

(65) Prior Publication Data
US 2021/0410119 A1 Dec. 30, 2021

Related U.S. Application Data

(60) Provisional application No. 63/043,715, filed on Jun. 24, 2020.

(51) Int. Cl.
*H04L 5/00* (2006.01)
*H04W 72/23* (2023.01)

(52) U.S. Cl.
CPC .............. *H04W 72/23* (2023.01); *H04L 5/001* (2013.01)

(58) Field of Classification Search
CPC ..... H04L 5/001; H04L 5/0055; H04L 5/0094; H04L 27/0006; H04L 5/0091; H04W 72/1289; H04W 72/042
See application file for complete search history.

(56) References Cited

U.S. PATENT DOCUMENTS

2011/0164664 A1* 7/2011 Torsner ................. H04L 1/1887
375/295
2016/0261383 A1* 9/2016 Bergström ............ H04L 1/1819
(Continued)

OTHER PUBLICATIONS

Intel Corporation: "Consideration on Joint DCI for CA with up to 32 CCs," 3GPP Draft, 3GPP TSG-RAN WG1 #82, R1-154005, 3rd Generation Partnership Project (3GPP), Mobile Competence Centre, 650, Route Des Lucioles, F-06921, Sophia-Antipolis Cedex, France, vol. RAN WG1, No. Beijing, China, Aug. 24, 2015-Aug. 28, 2015, Aug. 23, 2015 (Aug. 23, 2015), XP051001412, pp. 1-3, Retrieved from the Internet: URL: http://www.3gpp.org/ftp/Meetings_3GPP_SYNC/RAN1/Docs/ [retrieved on Aug. 23, 2015] section 2.
(Continued)

*Primary Examiner* — Chi Ho A Lee
*Assistant Examiner* — Andrew Lee
(74) *Attorney, Agent, or Firm* — Holland & Hart LLP

(57) ABSTRACT

Methods, systems, and devices for wireless communications are described. A user equipment (UE) may communicate with a base station over a set of component carriers according to a carrier aggregation configuration. In some cases, the UE may receive an indication of one or more groups of units, where each group may include one or more component carriers and/or one or more time intervals of each component carrier. The UE may receive downlink control information (DCI) including one or more fields that are common to a group of units that may schedule a set of data transmissions over the one or more groups of units such that the single DCI may schedule multiple component carriers (e.g., two or more) over one or more time intervals. The UE may transmit or receive the set of data transmissions (e.g., uplink or downlink data transmissions) over the scheduled units based on receiving the DCI.

30 Claims, 21 Drawing Sheets

(56) References Cited

U.S. PATENT DOCUMENTS

| | | | |
|---|---|---|---|
| 2016/0302203 A1* | 10/2016 | Liu | H04L 5/0098 |
| 2017/0338932 A1 | 11/2017 | Lee et al. | |
| 2018/0062804 A1* | 3/2018 | Liu | H04L 5/0037 |
| 2018/0115965 A1 | 4/2018 | Takeda et al. | |
| 2018/0338318 A1 | 11/2018 | Yum et al. | |
| 2019/0045533 A1* | 2/2019 | Chatterjee | H04L 5/0094 |
| 2019/0364592 A1 | 11/2019 | Bhattad et al. | |
| 2020/0343954 A1* | 10/2020 | Takeda | H04B 7/0626 |
| 2021/0006376 A1* | 1/2021 | Cirik | H04L 5/0094 |
| 2021/0022121 A1* | 1/2021 | Lin | H04L 5/0053 |
| 2021/0204260 A1* | 7/2021 | Liu | H04W 72/1273 |
| 2022/0264618 A1* | 8/2022 | Yoshimura | H04L 1/1812 |

OTHER PUBLICATIONS

International Search Report and Written Opinion—PCT/US2021/034998—ISA/EPO—dated Sep. 23, 2021 (205191 WO).

Qualcomm Incorporated: "DL Control Information Signalling for LTE CA of up to 32 CCs," 3GPP Draft, 3GPP TSG RAN WG1 #81, R1-152773, 3rd Generation Partnership Project (3GPP), Mobile Competence Centre, 650, Route Des Lucioles, F-06921, Sophia-Antipolis Cedex, France, vol. RAN WG1, No. Fukuoka, Japan, May 25, 2015-May 29, 2015, May 24, 2015 (May 24, 2015), XP050968822, 4 pages, Retrieved from the Internet: URL: http://www.3gpp.org/ftp/Meetings_3GPP_SYNC/RAN1/Docs/ [retrieved on May 24, 2015] section 2.

* cited by examiner

DOWNLINK CONTROL INFORMATION FOR SCHEDULING MULTIPLE COMPONENT CARRIERS

CROSS REFERENCE

The present Application for Patent claims the benefit of U.S. Provisional Patent Application No. 63/043,715 by TAKEDA et al., entitled "DOWNLINK CONTROL INFORMATION FOR SCHEDULING MULTIPLE COMPONENT CARRIERS," filed Jun. 24, 2020, assigned to the assignee hereof, and expressly incorporated by reference herein.

TECHNICAL FIELD

The following relates generally to wireless communications and more specifically to downlink control information (DCI) for scheduling multiple component carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support carrier aggregation (CA), where the UE communicates with multiple cells simultaneously. For example, the UE may communicate with a first base station (e.g., a primary cell (PCell), a first component carrier) and with a second base station (e.g., a secondary cell (SCell), a second component carrier) at the same time. Additionally or alternatively, a single base station may include multiple cells (e.g., both a PCell and an SCell, or multiple component carriers), where the UE communicates with two or more cells on the single base station at the same time. Efficient techniques are desired for enabling carrier aggregation communications.

SUMMARY

The described techniques relate to improved methods, systems, devices, and apparatuses that support downlink control information (DCI) for scheduling multiple component carriers. Generally, the described techniques provide for improving multi-component carrier scheduling procedures. A base station may transmit a DCI message to a user equipment (UE) that schedules data transmissions on multiple units (e.g., multiple components carriers, or multiple time intervals such as slots, transmission time intervals (TTIs), or a combination thereof). In some cases, the UE and the base station may be configured to support scheduled unit grouping where a single DCI may schedule one or more groups of units. For example, a UE may communicate with a base station over a set of component carriers according to a carrier aggregation configuration. In some cases, the UE may receive a configuration message that indicates one or more groups of units, where each group may include one or more component carriers and/or one or more slots of each component carrier. The UE may receive, from the base station, based on connecting to the base station, DCI including one or more fields (e.g., DCI fields) that are common to a group of units where the group may include multiple (e.g., two or more) component carriers from the set of component carriers. In some cases, the DCI may schedule a set of data transmissions over the one or more groups of units, where the data transmissions may be downlink data transmissions transmitted from the base station or uplink data transmissions transmitted from the UE. Subsequently, the UE may transmit or receive the set of data transmissions over the scheduled units based on receiving the DCI.

A method of wireless communication is described. The method may include communicating with a base station over a set of component carriers according to a carrier aggregation configuration, receiving, from the base station based on connecting to the base station, DCI including one or more fields that are common to two or more component carriers from the set of component carriers, the DCI scheduling a set of data transmissions over the two or more component carriers, and transmitting or receiving the set of data transmissions over the scheduled two or more component carriers based on receiving the DCI.

An apparatus for wireless communication is described. The apparatus may include at least one processor, memory coupled (e.g., operatively, communicatively, functionally, electronically, or electrically) with the at least one processor, and instructions stored in the memory. The instructions may be executable by the at least one processor to cause the apparatus to communicate with a base station over a set of component carriers according to a carrier aggregation configuration, receive, from the base station based on connecting to the base station, DCI including one or more fields that are common to two or more component carriers from the set of component carriers, the DCI scheduling a set of data transmissions over the two or more component carriers, and transmit or receive the set of data transmissions over the scheduled two or more component carriers based on receiving the DCI.

Another apparatus for wireless communication is described. The apparatus may include means for communicating with a base station over a set of component carriers according to a carrier aggregation configuration, receiving, from the base station based on connecting to the base station, DCI including one or more fields that are common to two or more component carriers from the set of component carriers, the DCI scheduling a set of data transmissions over the two or more component carriers, and transmitting or receiving the set of data transmissions over the scheduled two or more component carriers based on receiving the DCI.

A non-transitory computer-readable medium storing code for wireless communication is described. The code may include instructions executable by at least one processor to communicate with a base station over a set of component carriers according to a carrier aggregation configuration, receive, from the base station based on connecting to the base station, DCI including one or more fields that are common to two or more component carriers from the set of component carriers, the DCI scheduling a set of data transmissions over the two or more component carriers, and transmit or receive the set of data transmissions over the scheduled two or more component carriers based on receiving the DCI.

Some examples of the method, apparatuses, and non-transitory computer-readable medium described herein may further include operations, features, means, or instructions for receiving, from the base station, a configuration message indicating a group of component carriers including at least the two or more component carriers, where receiving the DCI scheduling the set of data transmissions may be based on receiving the configuration message indicating the two or more component carriers.

In some examples of the method, apparatuses, and non-transitory computer-readable medium described herein, receiving the DCI may include operations, features, means, or instructions for receiving an indication of a subset of component carriers from the group of component carriers, the subset of component carriers including the two or more component carriers, where transmitting or receiving the set of data transmissions over the two or more component carriers may be based on receiving the indication of the subset of component carriers.

In some examples of the method, apparatuses, and non-transitory computer-readable medium described herein, receiving the indication of the subset of component carriers may include operations, features, means, or instructions for receiving a bitmap indicating the two or more component carriers from the group of component carriers.

In some examples of the method, apparatuses, and non-transitory computer-readable medium described herein, receiving the indication of the subset of component carriers may include operations, features, means, or instructions for receiving an indication of a first component carrier, from the group of component carriers, within the subset of component carriers, and receiving an indication of a quantity of contiguous component carriers, from the group of component carriers, within the subset of component carriers.

In some examples of the method, apparatuses, and non-transitory computer-readable medium described herein, the indication of the subset of component carriers may be based on an order of resources associated with the group of component carriers, and the order may be a frequency-first order or a time-first order.

In some examples of the method, apparatuses, and non-transitory computer-readable medium described herein, the group of component carriers may be the two or more component carriers.

Some examples of the method, apparatuses, and non-transitory computer-readable medium described herein may further include operations, features, means, or instructions for receiving a configuration message indicating a set of parameters for each of the two or more component carriers, where the set of parameters for each of the two or more component carriers may be the same, and where receiving the DCI may be based on receiving the configuration message.

Some examples of the method, apparatuses, and non-transitory computer-readable medium described herein may further include operations, features, means, or instructions for receiving a configuration message indicating a first set of parameters for a first component carrier of the two or more component carriers, and identifying a set of parameters for remaining component carriers of the two or more component carriers based on the first set of parameters, where the first set of parameters for the first component carrier and the set of parameters for the remaining component carriers may be the same, and where receiving the DCI may be based on receiving the configuration message.

Some examples of the method, apparatuses, and non-transitory computer-readable medium described herein may further include operations, features, means, or instructions for attempting to decode a set of downlink transmissions of the set of data transmissions, and transmitting, to the base station, acknowledgement information associated with the set of downlink transmissions, where the acknowledgement information includes a single bit associated with the two or more component carriers, a set of bits each associated with one of the two or more component carriers, or a set of bits each associated with a TTI of one of the two or more component carriers.

In some examples of the method, apparatuses, and non-transitory computer-readable medium described herein, the DCI schedules the set of data transmissions over the two or more component carriers for a set of TTIs.

Some examples of the method, apparatuses, and non-transitory computer-readable medium described herein may further include operations, features, means, or instructions for identifying, based on receiving the DCI, a first identifier for a first hybrid automatic repeat request (HARQ) associated with the set of data transmissions during a first TTI of the set of TTIs, and incrementing the first identifier to generate a second identifier for a second HARQ associated with the set of data transmissions during a second TTI of the set of TTIs.

Some examples of the method, apparatuses, and non-transitory computer-readable medium described herein may further include operations, features, means, or instructions for identifying, based on receiving the DCI, a first timing parameter for transmitting a first HARQ associated with the set of data transmissions during a first TTI of the set of TTIs, and incrementing the first timing parameter to generate a second timing parameter for transmitting a second HARQ associated with the set of data transmissions during a second TTI of the set of TTIs.

In some examples of the method, apparatuses, and non-transitory computer-readable medium described herein, the two or more component carriers may be a first set of component carriers, the one or more fields that may be common to the first set of component carriers may be a first set of one or more fields, the set of data transmissions over the first set of component carriers may be a first set of data transmissions, the DCI includes a second set of one or more fields that may be common to a second set of two or more component carriers, and the DCI schedules a second set of data transmissions over the second set of two or more component carriers.

Some examples of the method, apparatuses, and non-transitory computer-readable medium described herein may further include operations, features, means, or instructions for transmitting or receiving the second set of data transmissions over the second set of two or more component carriers based on receiving the DCI including the second set of one or more fields that may be common to the second set of two or more component carriers.

In some examples of the method, apparatuses, and non-transitory computer-readable medium described herein, the first set of one or more fields and the second set of one or more fields share a field indicating a first parameter for the first set of data transmissions over the first set of component carriers and a second parameter for the second set of data transmissions over the second set of two or more component carriers, and the first parameter may be different from the second parameter.

Some examples of the method, apparatuses, and non-transitory computer-readable medium described herein may further include operations, features, means, or instructions for receiving a configuration message from the base station indicating a mapping from the shared field to the first parameter and the second parameter.

In some examples of the method, apparatuses, and non-transitory computer-readable medium described herein, the first parameter and the second parameter may be frequency domain resource allocation (FDRA) parameters, time domain resource allocation (TDRA) parameters, or both.

In some examples of the method, apparatuses, and non-transitory computer-readable medium described herein, a first component carrier of the two or more component carriers may have a first subcarrier spacing, and a second component carrier of the two or more component carriers may have a second subcarrier spacing different from the first subcarrier spacing.

A method of wireless communication is described. The method may include communicating with a UE over a set of component carriers according to a carrier aggregation configuration, transmitting, to the UE based on connecting with the UE, DCI including one or more fields that are common to two or more component carriers from the set of component carriers, the DCI scheduling a set of data transmissions over the two or more component carriers, and transmitting or receiving the set of data transmissions over the scheduled two or more component carriers based on transmitting the DCI.

An apparatus for wireless communication is described. The apparatus may include at least one processor, memory coupled (e.g., operatively, communicatively, functionally, electronically, or electrically) with the at least one processor, and instructions stored in the memory. The instructions may be executable by the at least one processor to cause the apparatus to communicate with a UE over a set of component carriers according to a carrier aggregation configuration, transmit, to the UE based on connecting with the UE, DCI including one or more fields that are common to two or more component carriers from the set of component carriers, the DCI scheduling a set of data transmissions over the two or more component carriers, and transmit or receive the set of data transmissions over the scheduled two or more component carriers based on transmitting the DCI.

Another apparatus for wireless communication is described. The apparatus may include means for communicating with a UE over a set of component carriers according to a carrier aggregation configuration, transmitting, to the UE based on connecting with the UE, DCI including one or more fields that are common to two or more component carriers from the set of component carriers, the DCI scheduling a set of data transmissions over the two or more component carriers, and transmitting or receiving the set of data transmissions over the scheduled two or more component carriers based on transmitting the DCI.

A non-transitory computer-readable medium storing code for wireless communication is described. The code may include instructions executable by at least one processor to communicate with a UE over a set of component carriers according to a carrier aggregation configuration, transmit, to the UE based on connecting with the UE, DCI including one or more fields that are common to two or more component carriers from the set of component carriers, the DCI scheduling a set of data transmissions over the two or more component carriers, and transmit or receive the set of data transmissions over the scheduled two or more component carriers based on transmitting the DCI.

Some examples of the method, apparatuses, and non-transitory computer-readable medium described herein may further include operations, features, means, or instructions for transmitting, to the UE, a configuration message indicating a group of component carriers including at least the two or more component carriers, where transmitting the DCI scheduling the set of data transmissions may be based on transmitting the configuration message indicating the two or more component carriers.

In some examples of the method, apparatuses, and non-transitory computer-readable medium described herein, transmitting the DCI may include operations, features, means, or instructions for transmitting an indication of a subset of component carriers from the group of component carriers, the subset of component carriers including the two or more component carriers, where transmitting or receiving the set of data transmissions over the two or more component carriers may be based on transmitting the indication of the subset of component carriers.

In some examples of the method, apparatuses, and non-transitory computer-readable medium described herein, transmitting the indication of the subset of component carriers may include operations, features, means, or instructions for transmitting a bitmap indicating the two or more component carriers from the group of component carriers.

In some examples of the method, apparatuses, and non-transitory computer-readable medium described herein, transmitting the indication of the subset of component carriers may include operations, features, means, or instructions for transmitting an indication of a first component carrier, from the group of component carriers, within the subset of component carriers, and transmitting an indication of a quantity of contiguous component carriers, from the group of component carriers, within the subset of component carriers.

In some examples of the method, apparatuses, and non-transitory computer-readable medium described herein, the indication of the subset of component carriers may be based on an order of resources associated with the group of component carriers, and the order may be a frequency-first order or a time-first order.

In some examples of the method, apparatuses, and non-transitory computer-readable medium described herein, the group of component carriers may be the two or more component carriers.

Some examples of the method, apparatuses, and non-transitory computer-readable medium described herein may further include operations, features, means, or instructions for transmitting a configuration message indicating a set of parameters for each of the two or more component carriers, where the set of parameters for each of the two or more component carriers may be the same, and where transmitting the DCI may be based on transmitting the configuration message.

Some examples of the method, apparatuses, and non-transitory computer-readable medium described herein may further include operations, features, means, or instructions for transmitting a configuration message indicating a first set of parameters for a first component carrier of the two or more component carriers, where the first set of parameters for the first component carrier and a set of parameters for remaining component carriers of the two or more component carriers may be the same, and where transmitting the DCI may be based on transmitting the configuration message.

Some examples of the method, apparatuses, and non-transitory computer-readable medium described herein may further include operations, features, means, or instructions for receiving, from the UE, acknowledgement information associated with a set of downlink transmissions from the set of data transmissions, where the acknowledgement information includes a single bit associated with the two or more component carriers, a set of bits each associated with one of the two or more component carriers, or a set of bits each associated with a TTI of one of the two or more component carriers.

In some examples of the method, apparatuses, and non-transitory computer-readable medium described herein, the DCI schedules the set of data transmissions over the two or more component carriers for a set of TTIs.

In some examples of the method, apparatuses, and non-transitory computer-readable medium described herein, the two or more component carriers may be a first set of component carriers, the one or more fields that may be common to the first set of component carriers may be a first set of one or more fields, the set of data transmissions over the first set of component carriers may be a first set of data transmissions, the DCI includes a second set of one or more fields that may be common to a second set of two or more component carriers, and the DCI schedules a second set of data transmissions over the second set of two or more component carriers.

Some examples of the method, apparatuses, and non-transitory computer-readable medium described herein may further include operations, features, means, or instructions for transmitting or receiving the second set of data transmissions over the second set of two or more component carriers based on transmitting the DCI including the second set of one or more fields that may be common to the second set of two or more component carriers.

In some examples of the method, apparatuses, and non-transitory computer-readable medium described herein, the first set of one or more fields and the second set of one or more fields share a field indicating a first parameter for the first set of data transmissions over the first set of component carriers and a second parameter for the second set of data transmissions over the second set of two or more component carriers, and the first parameter may be different from the second parameter.

Some examples of the method, apparatuses, and non-transitory computer-readable medium described herein may further include operations, features, means, or instructions for transmitting a configuration message to the UE indicating a mapping from the shared field to the first parameter and the second parameter.

In some examples of the method, apparatuses, and non-transitory computer-readable medium described herein, the first parameter and the second parameter may be FDRA parameters, TDRA parameters, or both.

In some examples of the method, apparatuses, and non-transitory computer-readable medium described herein, a first component carrier of the two or more component carriers may have a first subcarrier spacing, and a second component carrier of the two or more component carriers may have a second subcarrier spacing different from the first subcarrier spacing.

DETAILED DESCRIPTION

Figure 1:
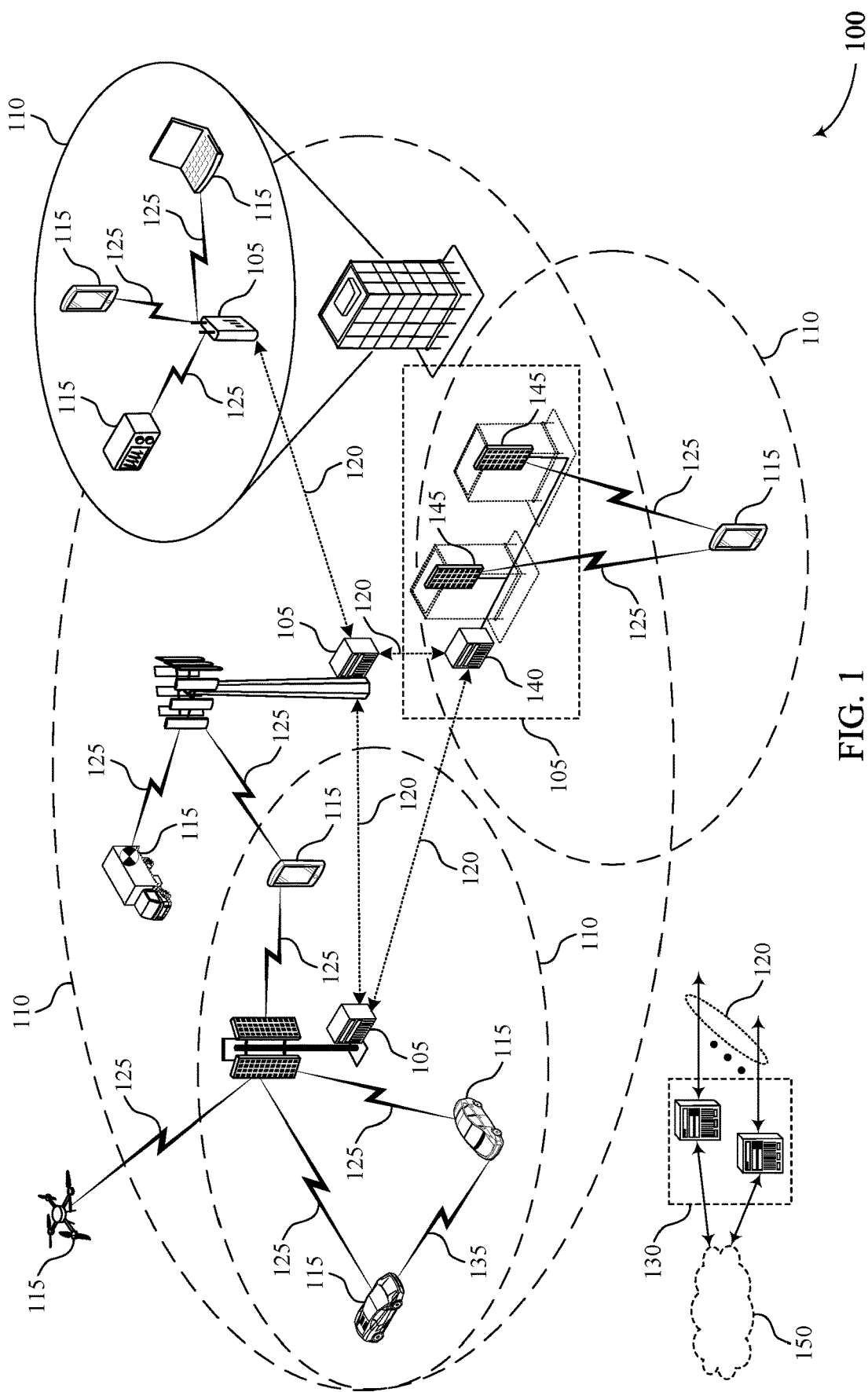
FIG. 1 illustrates an example of a system for wireless communications that supports downlink control information (DCI) for scheduling multiple component carriers in accordance with aspects of the present disclosure.

Some wireless communications systems may support communications between a user equipment (UE) and a base station on multiple aggregated component carriers, a feature referred to as carrier aggregation. For example, a UE may establish a connection with a base station over at least a first component carrier and a second component carrier. In some wireless communications systems, the first component carrier may refer to a component carrier corresponding to a dynamic spectrum sharing (DSS) primary cell (PCell), and the second component carrier may refer to a non-DSS secondary cell (SCell). In some other cases, both the first component carrier and the second component carrier may support DSS, or neither of the component carriers may support DSS.

In conventional systems, the UE may be configured to monitor for physical downlink control channel (PDCCH) messages on the DSS PCell for downlink control information (DCI) transmitted from a base station that schedules data transmissions, such as physical uplink shared channel (PUSCH) transmissions, or physical downlink shared channel transmissions (PDSCH) on one of the component carriers. To schedule data transmissions on multiple component carriers (e.g., multi-component carrier scheduling, joint-component carrier scheduling, cross-carrier scheduling), the UE may monitor for and receive multiple DCIs. However, transmitting by the base station or receiving by the UE multiple DCIs may increase signaling overhead that uses a high amount of resources to indicate the different transmission parameters for each component carrier. Further, the PCell may serve low frequency bands (e.g., 2 GHz) and the SCell may serve medium to high frequency bands (e.g., 3.5 to 4.7 GHz). As such, the PCell may be used by a large number of devices (e.g., NR UEs, and LTE UEs) and some of the devices (e.g., NR UEs) may not be able achieve peak throughput. In some cases, a combination of lowered throughput and multiple DCIs needed for multi-component carrier scheduling may reduce reliability of the network.

To improve reliability and increase spectral efficiency, a single DCI may be configured to schedule data transmissions (e.g., downlink data transmissions or uplink data transmissions) on multiple component carriers (e.g., two or more) such as a PCell and SCell or some other component carrier. The DCI may be transmitted on the non-DSS SCell, where the DCI may schedule data transmissions on one or more SCells, on or more PCells, or a combination thereof. In some cases, the single DCI may be configured to schedule multiple component carriers and/or multiple time intervals (e.g., slots, sub-slots, mini-slots, TTIs) of each component carrier. To mitigate the resources used to transmit or receive a DCI that schedules data transmissions on multiple component carriers and/or time intervals, devices in a communications system may be configured to support scheduled unit grouping. As part of scheduled unit grouping, units such as component carriers, or time intervals may be configured by a base station, for example, as part of a group. In some cases, the units may be grouped according to frequency resources, or time resources, or a combination thereof. Units within a group may be configured with the same or similar parameters (e.g., radio resource control (RRC) parameters, hybrid automatic repeat request (HARQ) process IDs, time domain parameters) such that the single DCI may schedule the group of units rather than each individual unit to mitigate the resources used for the DCI transmission. In some implementations, not all units in a group may be scheduled by each DCI transmissions. For example, a DCI may schedule a subset of units within a group, and may not schedule the remaining units of the group. To indicate which units in a group are scheduled by a DCI, a DCI format may be configured to include a bit-map or a resource indication value (RIV).

Particular aspects of the subject matter described herein may be implemented to realize one or more advantages. The described techniques may support improvements in multi-component carrier scheduling by decreasing signaling overhead, improving reliability, and increasing spectral efficiency among other advantages. As such, supported techniques may include improved network operations and, in some examples, may promote network efficiencies, among other benefits.

Aspects of the disclosure are initially described in the context of wireless communications systems. Aspects are the described with respect to component carrier scheduling configurations, bit-map indications, RIV configurations, a DCI format, a data retransmission procedure, and a process flow. Aspects of the disclosure are further illustrated by and described with reference to apparatus diagrams, system diagrams, and flowcharts that relate to DCI for scheduling multiple component carriers.

FIG. 1 illustrates an example of a wireless communications system 100 that supports DCI for scheduling multiple component carriers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), or mMTC (massive MTC), and NB-IoT may include eNB-IoT (enhanced NB-IoT), or FeNB-IoT (further enhanced NB-IoT).

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a sub-slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems 100 may support efficient techniques for a UE 115 to receive a DCI from a base station 105 that schedules multiple component carriers, multiple time intervals of one or more component carriers, or a combination thereof. For example, a UE 115 may communicate with a base station over a set of component carriers according to a carrier aggregation configuration. In some cases, the UE 115 may receive a configuration message that indicates one or more groups of units, where each group may include one or more component carriers and/or one or more slots of each component carrier. The UE 115 may receive, from the base station, based on connecting to the base station, DCI including one or more fields that are common to a group of units where the group may include multiple (e.g., two or more) component carriers from the set of component carriers. In some cases, the DCI may schedule one or more groups of units using different DCI fields in the same DCI format. In some cases, the DCI may schedule a set of data transmissions over the one or more groups of units, where the data transmissions may be downlink data transmissions transmitted from the base station 105 or uplink data transmissions transmitted from the UE 115. Subsequently, the UE 115 may transmit or receive the set of data transmissions over the scheduled units based on receiving the DCI.

Figure 2:
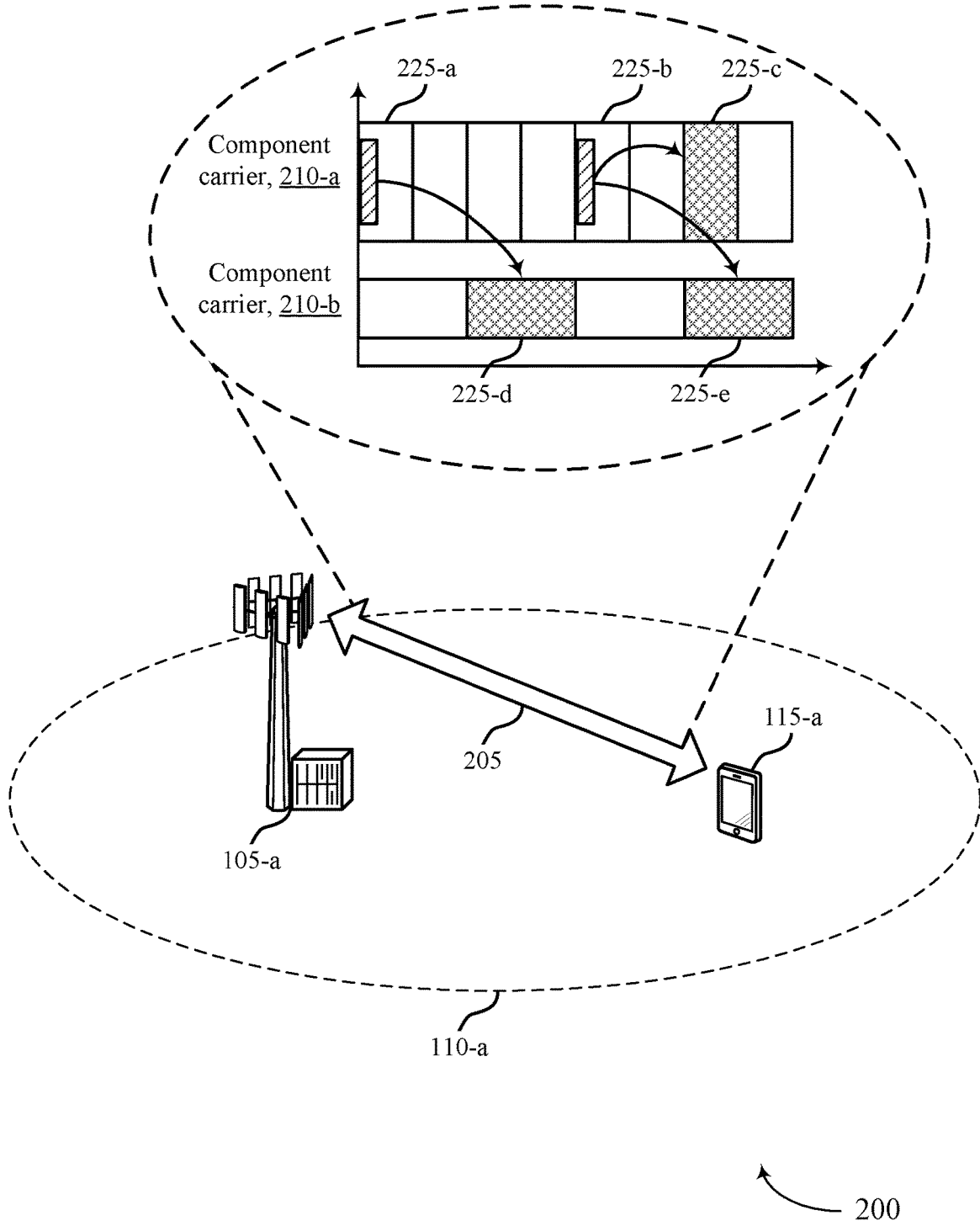
FIG. 2 illustrates an example of a system for wireless communications that supports DCI for scheduling multiple component carriers in accordance with aspects of the present disclosure.

FIG. 2 illustrates an example of a wireless communications system 200 that supports DCI for scheduling multiple component carriers in accordance with aspects of the present disclosure. The wireless communications system 200 may include a base station 105-a and a UE 115-a, which may be examples of a base station 105 and a UE 115 as described with reference to FIG. 1. Base station 105-a may serve a geographic coverage area 110-a. In some cases, base station 105-a may implement a multi-component carrier scheduling procedure with UE 115-a. Additionally or alternatively, other wireless devices, such as UE 115-a, may implement the multi-component carrier scheduling procedure.

UE 115-a may establish a connection with base station 105-a over at least a first component carrier and a second component carrier such as component carriers 210-a and 210-b via communication link 205, where communication link 205 may support downlink and uplink transmissions. In some cases, component carrier 210-b may correspond to a DSS PCell and component carrier 210-a may correspond to a non-DSS SCell. In some other cases, both component carrier 210-*a* and the component carrier 210-*b* may support DSS, or neither of the component carriers 210 may support DSS. In some cases, component carrier 210-*b* may support lower frequency bands (e.g., 2 GHz) and low subcarrier spacing (e.g., 15 kHz) and component carrier 210-*a* may support medium to high frequency bands (e.g., 3.5 GHz, 4.7 GHz) and high subcarrier spacing (e.g., 30 kHz). As such, the DSS PCell that supports lower frequency bands (e.g., component carrier 210-*b*) may serve multiple types of devices (e.g., LTE UEs, NR UEs) which may impact the ability of some devices to achieve peak throughput because the resources of the component carrier 210 are being shared across the multiple types of devices and each type of device may not be able to utilize the full set of resources in the given spectrum. To support network improvements such as improved reliability and increased spectral efficiency, the base station 105-*a* and UE 115-*a* may be configured to support data transmission scheduling information placed on the non-DSS SCell that supports higher frequencies (e.g., component carrier 210-*a*) because component carrier 210-*a* may serve a single type of device (e.g., 5G NR devices) and the full spectrum supported by component carrier 210-*a* may be used by each device on component carrier 210-*a*.

To further improve network reliability and increased spectral efficiency, a single data scheduling indication (e.g., PDCCH, DCI format, DCI) may be used to schedule data transmissions (e.g., downlink data transmissions or uplink data transmissions) on multiple component carriers (e.g., multiple cells), such as component carriers 210-*a* and 210-*b*, or multiple time intervals 225, or a combination thereof rather than multiple scheduling indications being used to schedule the multiple component carriers 210. In an example, a physical control channel 215 (e.g., PDCCH) on component carrier 210-*a* may schedule multiple (e.g., two or more) physical shared channels 220 (e.g., PDSCH, PUSCH) on component carriers 210-*a* or 210-*b*, or both using a single DCI. In another example, a physical control channel 215 (e.g., PDCCH) on component carrier 210-*b* may schedule a physical shared channel 220 (e.g., PDSCH, PUSCH) on component carriers 210-*a* and 210-*b* using a single DCI.

To mitigate the resources used for transmitting or receiving a physical control channel 215 that schedules data transmissions on multiple component carriers 210 and/or multiple time intervals 225, devices in a communications system (e.g., wireless communications system 200) may be configured to support scheduled unit grouping. As part of scheduled unit grouping, units such as component carriers 210, or time intervals 225 may be configured by a base station, for example, as part of a group. In some cases, the groups may be configured based on frequency resources, or time resources, or a combination thereof. For example, component carriers 210-*a* and 210-*b* may be configured as part of the same group or different groups. In another example, all or a subset of time intervals 225 (e.g., slots, sub-slots, or mini-slots, TTIs) of component carrier 210-*a* may be configured as part of a group, such that one or more of time intervals 225-*a*, 225-*b*, or 225-*c* may be configured as part of the same group. Additionally or alternatively, the time intervals 225 of component carrier 210-*a* may be divided into multiple groups. As another example, all or a subset of time intervals 225 of component carrier 210-*b* may be configured as part of a group, such that one or more of time intervals 225-*d*, or 225-*e* may be configured as part of the same group. Additionally or alternatively, the time intervals 225 of component carrier 210-*b* may divided into multiple groups.

Units within a group may be configured with the same or similar parameters (e.g., RRC parameters, HARQ IDs, frequency domain parameters, time domain parameters) such that the single physical control channel 215 may schedule the group of units rather than each individual unit to mitigate the resources used for the DCI transmission. For example, a subset of time intervals 225 of component carrier 210-*a* may be configured as part of the same group. Each time interval 225 in the group may be associated with the same parameters, or mostly the same parameters (for example, parameters related to time may be different between the time intervals 225 in the same group).

Figure 3:
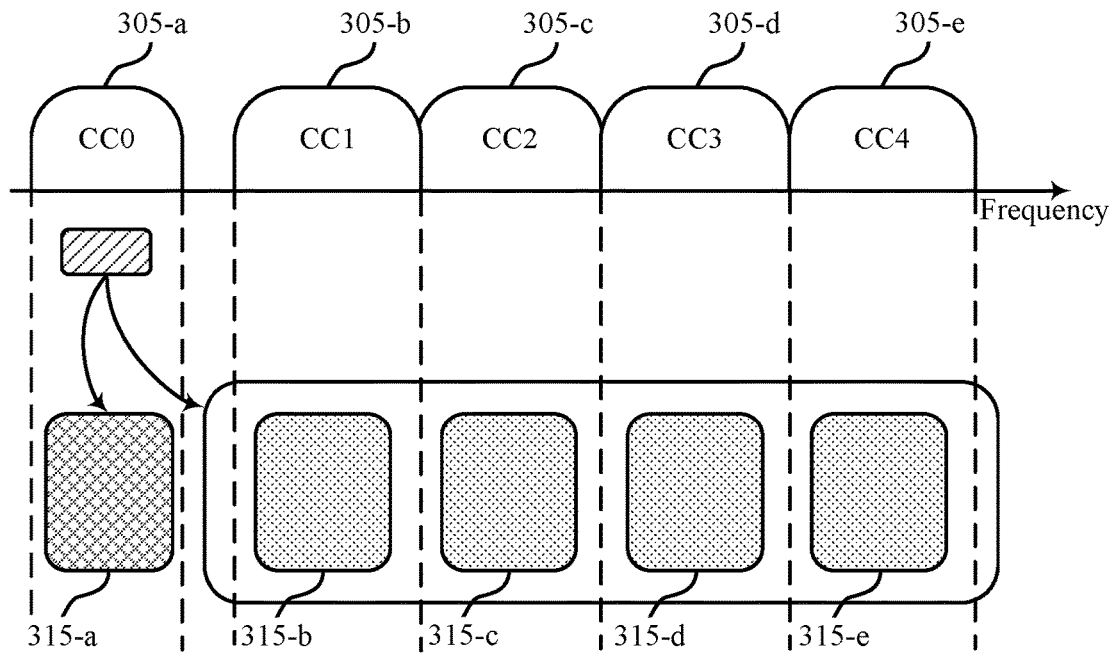
FIGS. 3 and 4 illustrate examples of component carrier scheduling configurations that support DCI for scheduling multiple component carriers in accordance with aspects of the present disclosure.
Figure 3:
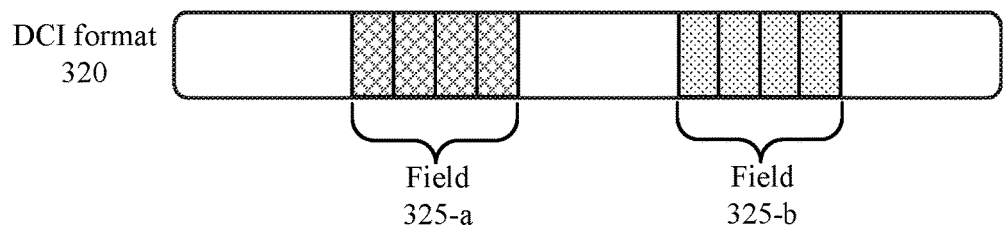

FIG. 3 illustrates an example of a component carrier scheduling configuration 300 that supports DCI for scheduling multiple component carriers in accordance with aspects of the present disclosure. Component carrier scheduling configuration 300 may be performed by a base station or a UE, or both, which may be examples of a base station and a UE as described with reference to FIGS. 1 and 2. In some cases, a base station may implement a multi-component carrier scheduling procedure with a UE according to component carrier scheduling configuration 300. Additionally or alternatively, other wireless devices, such as a UE, may implement the multi-component carrier scheduling procedure.

As described herein, a UE may communicate with a base station over a set of component carriers 305 according to a carrier aggregation configuration. For example, a UE may communicate with a base station over one or all of component carriers CC0 305-*a*, CC1 305-*b*, CC2 305-*c*, CC3 305-*d*, or CC4 305-*e*, where each component carrier 305 may be a DSS component carrier, a non-DSS component carrier, a PCell, or an SCell. To efficiently schedule data transmissions such as downlink or uplink data transmissions on one or more of the component carriers 305, a base station or some other network device may configure unit groups, where a unit may refer to component carrier 305, or a time interval of a component carrier 305, or a combination thereof. For example, as depicted in FIG. 3, the base station may group component carriers 305. In some cases, the base station may group component carriers 305 based on component carriers 305 being in the same frequency band. For example, communications between the base station and the UE may occur over two bands, where CC0 305-*a* is associated with a first band, and CC1 305-*b*, CC2 305-*c*, CC3 305-*d*, and CC4 305-*e* are associated with a second band. As such, the base station may configure CC0 305-*a* as part of group 1 and configure CC1 305-*b*, CC2 305-*c*, CC3 305-*d*, and CC4 305-*e* as part of group 2. The base station may indicate the grouping configuration to a UE via semi-static signaling (e.g., RRC signaling). For example, the base station may configure and indicate the component carrier grouping to one or more UEs prior to communications using the multiple component carriers 305.

Component carriers 305 may each be associated with a set of parameters, such as RRC parameters. In some implementations, due to the unit grouping, each parameter of a set of parameters associated with each component carrier 305 of a group of component carriers 305 may be the same. For example, the RRC parameters associated with each component carrier 305 in group 1 may be the same and the RRC parameters associated with each component carrier 305 in group 2 may be the same, where the RRC parameters across group 1 and group 2 may be different.

In some cases, the network (e.g., a base station) may configure the RRC parameters for each component carrier 305 in a group, where the RRC parameters are the same for each component carrier 305, and indicate the RRC parameters for each component carrier to a UE. Additionally or alternatively, once the component carriers 305 are configured to be in the same group, then the RRC parameters for a particular component carrier 305 in the group may be considered as being replicated to the other component carriers 305 in the same group by the UE. For example, a UE may receive an indication of the component carriers 305 that are configured as part of a group, and the UE may identify (for example, based on previous signaling from the base station) RRC parameters for at least one of the component carriers 305 within a group. The UE may apply the RRC parameters for the one component carrier 305 to all component carriers 305 within the group.

In some cases, DCI fields 325 may be common or joint across component carriers 305 in a group. For example, a codepoint of a DCI field 325 may indicate the same value for all component carriers in the same group. As such, component carrier 305 in a group may be referred to as mirrors where time domain resource allocations (TDRA), frequency domain resource allocations (FDRA), or a modulation and coding scheme (MCS) index are the same across component carriers 305 in a group. Because some parameters or all parameters (e.g., TDRA, FDRA parameters) for each unit are the same, or mostly the same, the DCI can mitigate the number of sets of parameters included in the DCI because the DCI may include one set of parameters for each group rather than indicating the set of parameters for each unit. In cases, where the parameters are mostly the same, the DCI may combine the like parameters for a group and indicate those parameters once for a group, and separately indicate the non-like parameters for each unit. Across different groups, separate DCI fields 325 may be included in the same DCI format 320, where each separate DCI field 325 may include data transmission scheduling information on the component carriers 305 included in the group the DCI field 325 is associated with.

As such, a base station may efficiently schedule one or more data transmissions on a group rather than individually scheduling each component carrier 305. For example, as described herein, a base station may configure a UE with two groups, where group 1 includes CC0 305-a and group 2 includes CC1 305-b, CC2 305-c, CC3 305-d, and CC4 305-e. Each component carrier 305 in group 1 may be associated with the same set of parameters, and each component carrier 305 in group 2 may be associated with the same set of parameters. To schedule data transmissions on one or more of the component carriers 305, a base station may transmit a physical control channel 310 over CC0 305-a, where the physical control channel 310 may include DCI format 320. DCI format 320 may include DCI field 325-a and DCI field 325-b, where DCI fields 325-a and 325-b may the same size or different sizes based on RRC configuration for each group. DCI field 325-a may include data transmission scheduling information for group 1 that applies to each component carrier 305 in group 1, and DCI field 325-b may include data transmission scheduling information for group 2 that applies to each component carrier 305 in group 2. For example, DCI field 325-a may indicate information for data transmission 315-a on CC0 305-a associated with group 1, and DCI field 325-b may indicate information for data transmissions 315-b though 315-e on CC1 305-b through CC4 305-e, respectively, associated with group 2.

Figure 4:
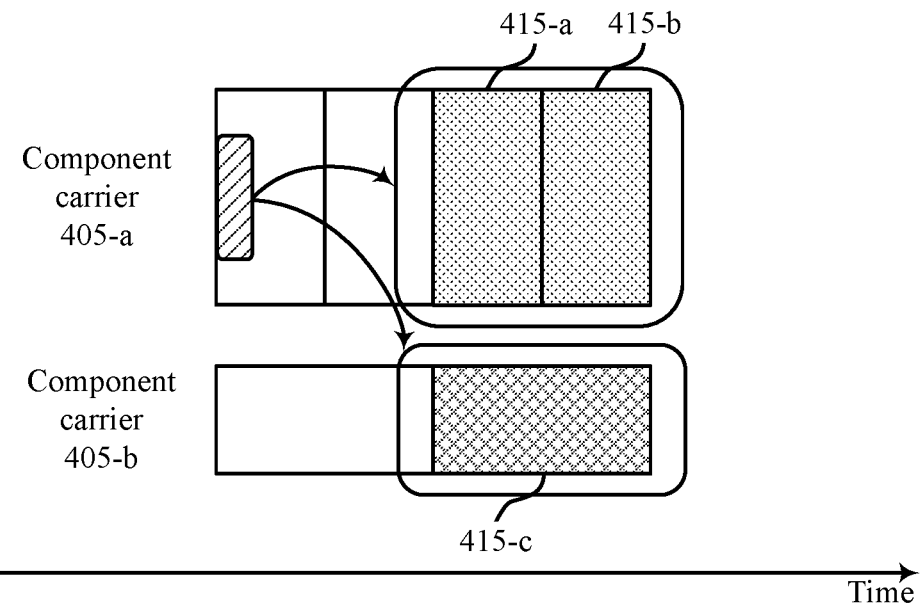
Figure 4:
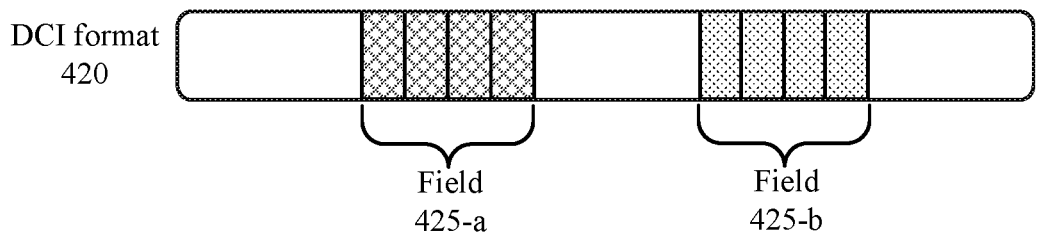

FIG. 4 illustrates an example of a component carrier scheduling configuration 400 that supports DCI for scheduling multiple component carriers in accordance with aspects of the present disclosure. Component carrier scheduling configuration 400 may be determined by a base station or a UE, or both, which may be examples of a base station and a UE as described with reference to FIGS. 1 through 3. In some cases, a base station may implement a multi-component carrier scheduling procedure with a UE based on component carrier scheduling configuration 400. Additionally or alternatively, other wireless devices, such as a UE, may implement the multi-component carrier scheduling procedure.

As described herein, a UE may communicate with a base station over a set of component carriers 405 according to a carrier aggregation configuration. For example, a UE may communicate with a base station over one or both of component carriers 405-a or 405-b, where each component carrier 405 may be a DSS component carrier, a non-DSS component carrier, a PCell, or an SCell. To efficiently schedule data transmissions such as downlink or uplink data transmissions on one or more of the component carriers 405, a base station or some other network device may configure unit groups, where a unit may refer to component carrier 405, or a time interval 415 (e.g., slot) of a component carrier 405, or a combination thereof. For example, as depicted in FIG. 4, the base station may group time intervals 415 of a component carrier 405. The base station may also group time intervals 415 and component carriers 405 such that the base station may configure one or more time intervals 415 of multiple component carrier 405 as part of the same group. In some cases, the base station may group component carriers 405 based on component carriers being in the same frequency band. For example, communications between the base station and the UE may occur over two bands, where component carrier 405-a is associated with a first band, and component carrier 405-b is associated with a second band. As such, the base station may configure one or more time intervals 415 of component carrier 405-a as part of group 1 and configure one or more time intervals 415 of component carrier 405-b as part of group 2.

In some cases, the base station may determine which time intervals 415 or which component carriers 405 to include in a group based on subcarrier spacing of each component carrier 405. In some cases, a base station may group component carriers 405 and time intervals 415 based on the component carriers 405 being in the same frequency band, or having the same subcarrier spacing, or both. For example, component carrier 405-a may have a larger subcarrier spacing (e.g., 30 kHz) than component carrier 405-b (e.g., 15 kHz). Additionally or alternatively, component carriers 405-a and 405-b may be in different frequency bands. As such, the base station may configure each component carrier 405 as part of a different group. Due to the different subcarrier spacings of the component carriers 405, two time intervals 415 of component carrier 405-a may fit into the same duration as one time interval 415 of component carrier 405-b. The base station may group time intervals 415 based on the number of time intervals 415 that fit into a duration. For example, the base station may first assign time interval 415-c to group 1, and then determine that two time intervals 415 of component carrier 405-a, such as time intervals 415-a and 415-b, fit into the same duration as time interval 415-c. As such, the base station may group intervals 415-a and 415-b as part of group 2. The base station may indicate the grouping configuration to a UE via semi-static signaling (e.g., RRC). For example, the base station may configure and indicate the time interval 415 grouping to one or more UEs prior to communications using the multiple component carriers 405.

In some implementations, due to the unit grouping, each parameter of a set of parameters associated with each component carrier 405 of a group of component carriers 405 may be the same. For example, the RRC parameters associated with each time interval 415 and each component carrier 405 in group 1 may be the same and the RRC parameters associated with each time interval 415 and each component carrier 405 in group 2 may be the same, where the RRC parameters across group 1 and group 2 may be different. In some cases, the network (e.g., a base station) may configure the parameters (e.g., RRC parameters) for each component carrier 405 and time interval 415 in a group, where the parameters are the same, or mostly the same, for each unit in the group, and indicate the parameters for each unit to the UE. Additionally or alternatively, once the component carriers 405 and/or time intervals 415 are configured to be in the same group, then the RRC parameters for a particular component carrier 405 or time interval 415 in the group may be considered as being replicated to the other units in the same group by the UE. For example, a UE may receive an indication of the component carriers 405 and time intervals 415 that are configured as part of a group, and the UE may identify (for example, based on previous signaling from the base station) RRC parameters for at least one of the units within a group. The UE may apply the RRC parameters for the one unit to all units within the group.

In some cases, DCI fields 425 may be common or joint across component carriers 405 and/or time intervals 415 in a group. For example, a codepoint of a DCI field 425 may indicate the same value for all component carriers 405 and time intervals 415 in the same group. Across different groups, separate DCI fields 425 may be included in the same DCI format 420, where each separate DCI field 425 may include data transmission scheduling information for each unit included in the group that the DCI field 425 is associated with. As such, the units in a group may be referred to as mirrors where a TDRA, FDRA, MCS index, or a start and length indicator (SLIV) are the same across units in a group. Because parameters that are included in DCI in a set of parameters for each group are the same, or mostly the same, the base station may mitigate the number of sets of parameters included in the DCI because the DCI can include one set of parameters for each group rather than indicating the set of parameters for each unit resulting in the common or joint DCI fields 425.

In some implementations, not all parameters in a set of parameters may be the same across time intervals 415 in a group. For example, K0, K1, and HARQ process IDs, among other parameters, may be based on time, where K0 and K1 may be TDRAs. As such, the parameters may change with different time intervals 415. For example, a K0 value indicates the number of time intervals 415 (e.g., slots, sub-slots, or mini-slots) from the time interval 415 in which a physical control channel 410 (e.g., DCI) was received to the time interval 415 the DCI schedules for downlink data transmissions, as such K0 will be different for different time intervals 415 in a group. Similarly, K2 indicates the number of time intervals 415 between the DCI and an uplink data transmission the DCI schedules. For example, if physical control channel 410 includes DCI that schedules time interval 415-a and 415-b for downlink data transmissions, then the K0 value for time interval 415-a will be two and the K0 value for time interval 415-b will be three. K2 value and HARQ process ID will also change based on slot.

In cases, where the parameters are mostly the same (e.g., grouping time intervals 415 where TDRAs change based on time), the DCI may combine the like parameters for a group and indicate those parameters once for a group (e.g., in joint or common DCI fields 425), and separately indicate the non-like parameters for each unit. In some cases, the DCI may indicate TDRAs (e.g., K0, K2, HARQ ID) for each time interval 415 of a group, where time intervals 415 may be in the same component carrier 405 or different component carriers 405 within a group. In some cases, the DCI may indicate TDRAs for a certain time interval 415 of one or more component carriers 405 in a group, such as the first scheduled time interval 415 of each component carrier 405, or the first scheduled time interval 415 of a certain component carrier 405. The UE may then increment the TDRAs accordingly for each scheduled time interval 415 following the time interval 415 the TDRAs are indicated for.

As such, a base station may efficiently schedule one or more data transmissions on a group rather than individually scheduling each unit. For example, as described herein, a base station may configure a UE with two groups, where group 1 includes component carrier 405-b and group 2 includes component carrier 405-a. Each component carrier 405 in group 1 may be associated with the same set of parameters (e.g., RRC parameters, FDRA parameters), and each component carrier 305 in group 2 may be associated with the same set of parameters. However, time intervals 415 within the same group may be associated with different time related parameters (e.g., TDRAs). To schedule data transmissions on one or more of the component carriers 405, a base station may transmit a physical control channel 410 over component carrier 405-a, where the physical control channel 410 may include DCI format 420. DCI format 420 may include DCI field 425-a and DCI field 425-b, which may have the same size or different sizes based on an RRC configuration for each group. DCI field 425-a may include data transmission scheduling information for group 1 that applies to each unit in group 1, and DCI field 425-b may include data transmission scheduling information for group 2 that applies to each unit in group 2. In some cases, each DCI field 425 may include TDRA information for each unit or one unit rather than for each group. For example, DCI field 425-b may indicate information for a data transmission on time interval 415-a and/or 415-b on component carrier 405-a associated with group 2, and DCI field 425-a may indicate information for a data transmissions in time interval 415-c on component carrier 405-b associated with group 1.

Figure 5A:
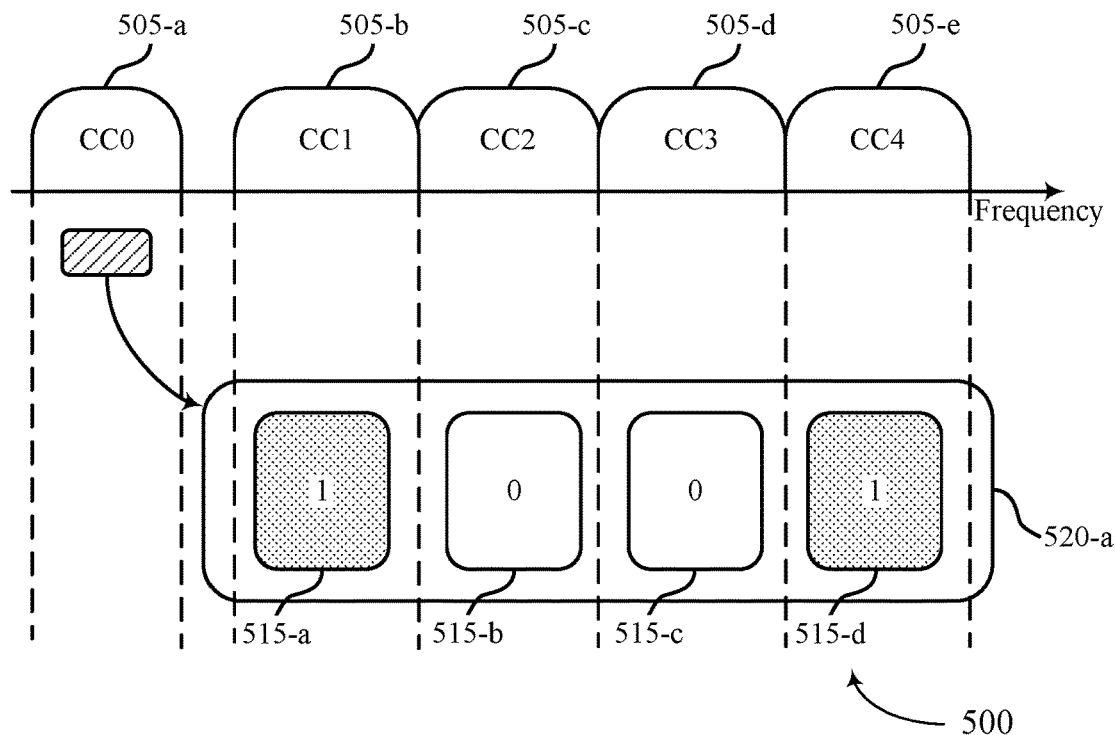
FIGS. 5A and 5B illustrate examples of bit-map indications that support DCI for scheduling multiple component carriers in accordance with aspects of the present disclosure.
Figure 5B:
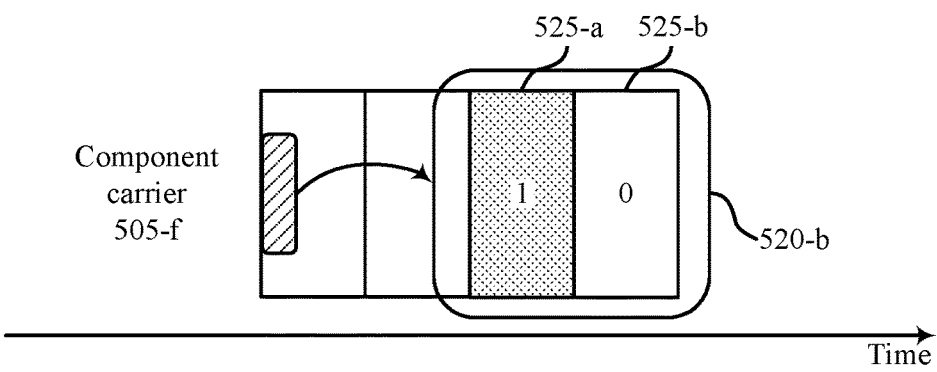

FIGS. 5A and 5B illustrate examples of bit-map indications 500 and 501, respectively, that support DCI for scheduling multiple component carriers in accordance with aspects of the present disclosure. Bit-map indications 500 and 501 may be configured by a base station or a UE, or both, which may be examples of a base station and a UE as described with reference to FIGS. 1 through 4. In some cases, a base station may implement a multi-component carrier scheduling procedure with a UE that includes bit-map indications 500 and/or 501. Additionally or alternatively, other wireless devices, such as a UE, may implement the multi-component carrier scheduling procedure.

A base station may group units (e.g., component carriers 505, time intervals 525) semi-statically and indicate the groupings to a UE via RRC signaling, or some other semi-static signaling procedure. In some cases, not all units in a group 520 may be scheduled with each physical control channel 510 (e.g., DCI). For example, the units scheduled by each DCI may be based on traffic, traffic conditions, or power restrictions. As such, the base station may configure and transmit a bit-map to a UE for each configured group to indicate which units in a group 520 are scheduled. The bit-map may be included in DCI, where the bit-map is group-specific. For example, a DCI format may include scheduling information for a first group and a second group. As such, the DCI format may include a bit-map for group 1 and a bit-map for group 2. The bit-map may include a bit for each unit in a group. For example, if a group includes a single time interval for one or more component carriers, the bit-map for the group may include one bit for each component carrier. In another example, if the group includes multiple time intervals for one or more component carriers, the bit-map for the group may include one bit for each time interval. A 1-bit may indicate that the unit is scheduled for data transmissions, and a 0-bit may indicate that the unit is not scheduled for data transmissions.

As depicted in FIG. 5A, the base station may group component carriers 505 based on the component carriers 505 being in the same frequency band as described with reference to FIG. 3. For example, the base station may group CC0 505-*a* as one group, and group CC1 505-*b*, CC2 505-*c*, CC3 505-*d*, and CC4 505-*e* as group 2 520-*a*. In some cases, the base station may potentially schedule data transmissions 515 on each component carrier 505. For example, the base station may determine to schedule data transmissions 515 (e.g., data transmissions 515-*a* 515-*b*, 515-*c*, and 515-*d*) on each component carrier 505 or a subset of component carriers. As in the example depicted in FIG. 5A, the base station may determine to schedule data transmissions on CC1 505-*b* and CC4 505-*e*, and not on CC2 505-*c* and CC3 505-*d*. As such, the base station may configure a 4-bit bit-map for group 520-*a* that includes a bit for each component carrier 505, where the bit-map may read as 1001. The UE may receive the bit-map in DCI of physical control channel 510-*a* and determine that CC1 505-*b* and CC4 505-*e* are scheduled for data transmissions.

As depicted in FIG. 5B, the base station may group time intervals 525 alone or in combination with grouping component carriers 505. For example, the base station may group time intervals 525-*a* and 525-*b* of component carrier 505-*f* in group 520-*b*. In some cases, the base station may potentially schedule data transmissions on each time interval 525 of group 520-*b*. In some cases, as depicted in FIG. 5B, the base station may determine to schedule data transmissions on a subset of the time intervals 525 of group 520-*b*. For example, the base station may determine to schedule data transmissions on time interval 525-*a*. As such, the base station may configure a 2-bit bit-map for group 520-*b* that includes a bit for each time interval 525, where the bit-map may read as 10. The UE may receive the bit-map in DCI of physical control channel 510-*a* and determine that time interval 525-*a* is scheduled for data transmissions and time interval 525-*b* is not.

Figure 6A:
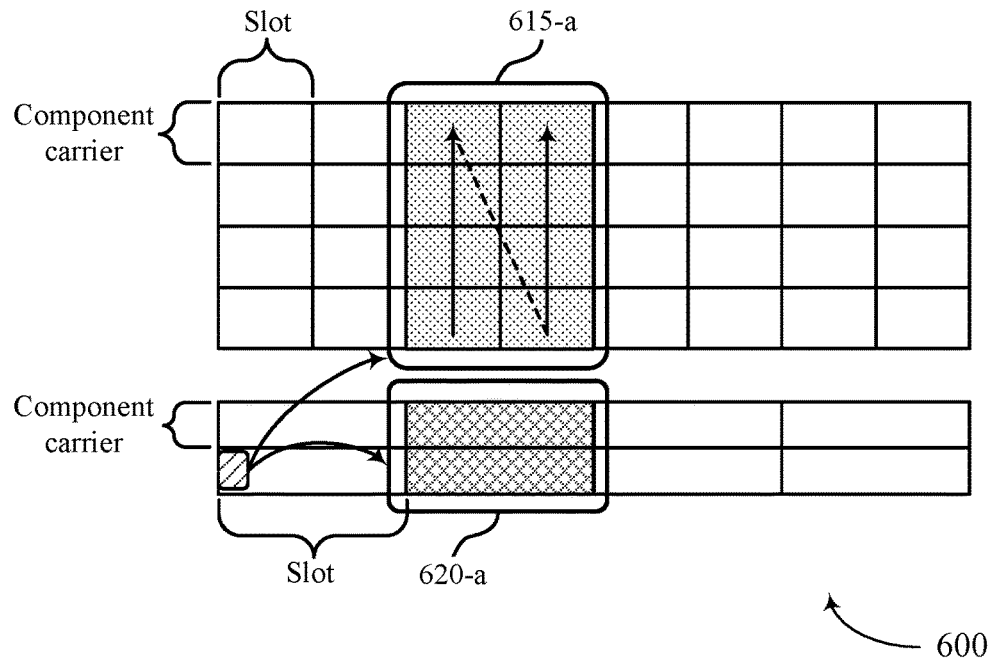
FIGS. 6A and 6B illustrate examples of resource indication value (RIV) configurations that support DCI for scheduling multiple component carriers in accordance with aspects of the present disclosure.
Figure 6B:
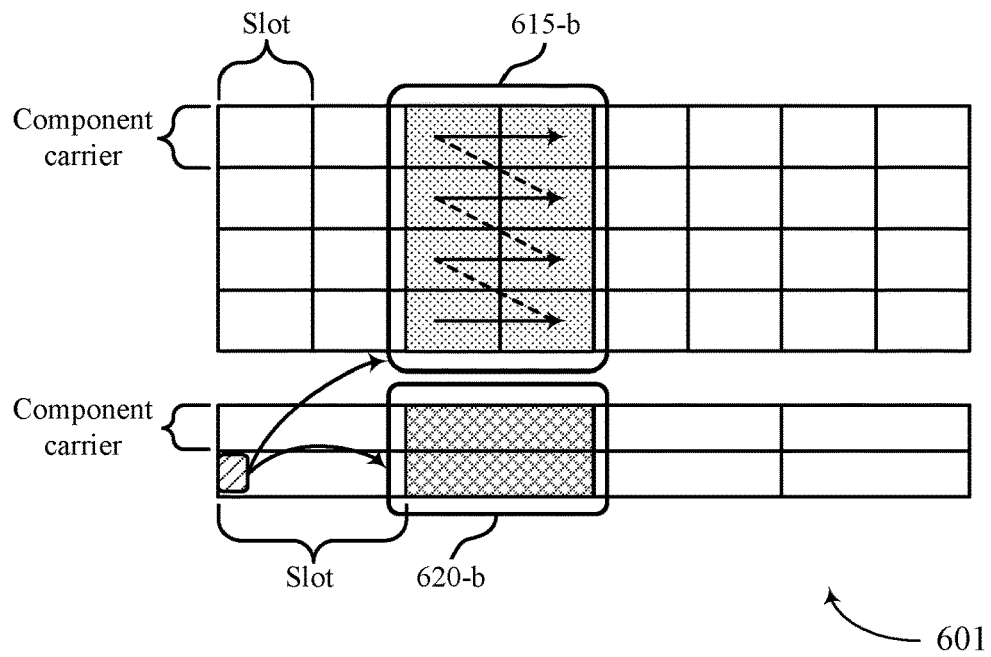

FIGS. 6A and 6B illustrate examples of RIV configurations 600 and 601, respectively, that support DCI for scheduling multiple component carriers in accordance with aspects of the present disclosure. RIV configurations 600 and 601 may be configured by a base station or a UE, or both, which may be examples of a base station and a UE as described with reference to FIGS. 1 through 5B. In some cases, a base station may implement a multi-component carrier scheduling procedure with a UE that utilizes RIV configurations 600 and/or 601. Additionally or alternatively, other wireless devices, such as a UE, may implement the multi-component carrier scheduling procedure.

In some cases, such as when a base station configures a large amount of units as part a group, a large number of bits may be used in a DCI to include a bit-map that includes a bit for each unit of the group. For example, a base station may group multiple component carriers and/or multiple slots (e.g., time intervals) in the same group. As such, in some implementations, the base station may indicate an RIV to a UE rather than a bit-map to mitigate the number of bits (e.g., mitigate bit width) included in a DCI. An RIV may be included in the DCI and may indicate a set of contiguous units in a group that are scheduled. The RIV may indicate the starting unit (e.g., the first unit that data is scheduled) and the number of consecutive units the DCI schedules after the starting unit. Based on the RIV, the UE may determine which units are scheduled. A DCI format may include multiple RIV fields, where each RIV field is associated with a different group of units.

In some implementations, such as if multiple component carriers and multiple slots are included in the same group, the interpretation of contiguous units may be defined. In some cases, the interpretation may be defined and signaled to a UE aperiodically, semi-statically (e.g., via RRC), or dynamically (e.g., via DCI). For example, as depicted in FIG. 6A, the order of units indicated by the RIV field may be frequency first and time second. In FIG. 6A, group 615-*a* may include four component carrier and two slots for each component carrier. As such, group 615-*a* may include 8 units. A base station may schedule data transmissions on all 8 units or on a subset of the 8 units. The base station may include an RIV field in the DCI included in physical control channel 610-*a* that indicates the first unit that is scheduled and the number of consecutive units following the first unit that are scheduled. In the example of FIG. 6A, the interpretation of the contiguous units is frequency first and time second. As such, if the base station schedules all 8 units in group 615-*a*, the UE may receive the DCI in physical control channel 610-*a* and determine based on the RIV field that the starting unit is the bottom-most, left-most unit of group 615-*a* and determine that the next scheduled unit is in the next component carrier. The UE may move up in component carriers until the last component carrier of group 615-*a* is reached, then move to the next slot and start at the bottom-most component carrier of the next slot. The UE may continue moving up in component carriers until the UE reaches the last component carrier of the second slot. The UE may identify the data transmissions for each unit in this fashion until the UE reaches the top-most, right-most unit of group 615-*a*.

In some cases, a DCI format may indicate data transmission schedules for more than one group, such as group 615-*a* and 620-*a*. The base station may indicate the scheduled units differently for different groups. For example, the base station may indicate a bit-map for one group, and an RIV field for another group. In some cases, the base station may determine to use an RIV field to indicate scheduled units based on a threshold number of units included in a group. For example, group 615-*a* may include a number of units that exceeds the threshold and group 620-*a* may include a number of units that is lower than the threshold. As such, physical control channel 610-*a* may include DCI fields for group 615-*a* that includes an RIV field, and DCI fields for group 620-*a* that includes a bit-map for group 620-*a*.

In another example, as depicted in FIG. 6B, the order of units indicated by the RIV field may be time first and frequency second. In FIG. 6B, group 615-*b* may, similarly to group 615-*a*, include 8 units. As such, if the base station schedules all 8 units in group 615-*b* or a subset of the units, the UE may receive the DCI in physical control channel 610-*b* and determine based on the RIV field that the starting unit is the bottom-most, left-most unit of group 615-*b* and determine that the next scheduled unit is in the next slot. The UE may move slot by slot until all slots of the current component carrier are identified. Then the UE may move up to the next component carrier of group 615-*b* and continue slot by slot. The UE may identify the data transmissions for each unit in this fashion until the UE reaches the top-most, right-most unit of group 615-*b*. Similarly as the example depicted in FIG. 6A, group 615-*b* may include a number of units that exceeds the threshold and group 620-*b* may include a number of units that is lower than the threshold. As such, physical control channel 610-*b* may include DCI fields for group 615-*b* that includes an RIV field, and DCI fields for group 620-*b* that includes a bit-map for group 620-*b*.

Figure 7:
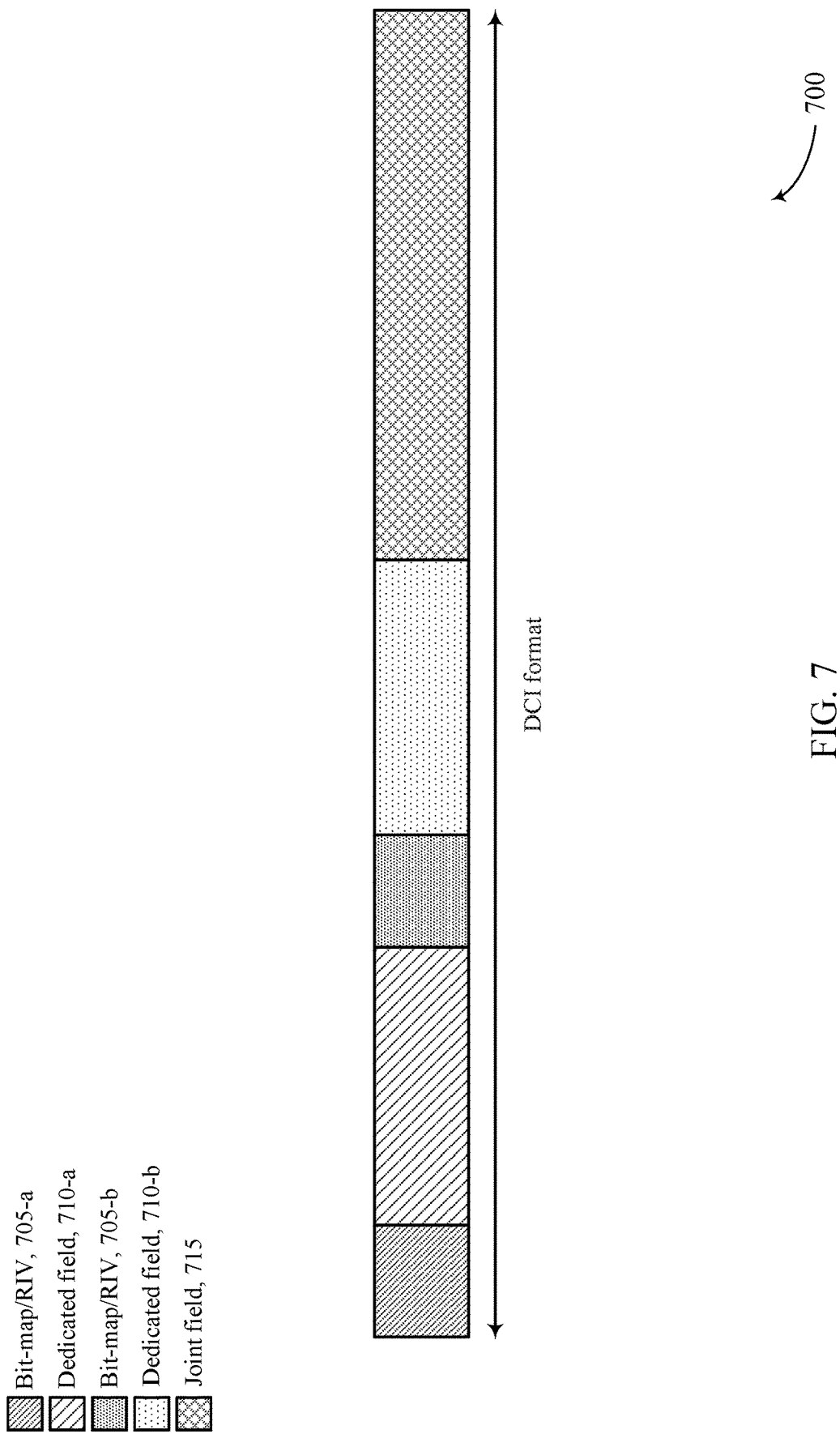
FIG. 7 illustrates an example of a DCI format that supports DCI for scheduling multiple component carriers in accordance with aspects of the present disclosure.

FIG. 7 illustrates an example of a DCI format 700 that supports DCI for scheduling multiple component carriers in accordance with aspects of the present disclosure. DCI format 700 may be configured by a base station or a UE, or both, which may be examples of a base station and a UE as described with reference to FIGS. 1 through 6B. In some cases, a base station may implement a multi-component carrier scheduling procedure with a UE that includes transmitting DCI format 700 to the UE. Additionally or alternatively, other wireless devices, such as a UE, may implement the multi-component carrier scheduling procedure with DCI format 700.

In the example depicted in FIG. 7, a base station may configure two groups of units, where each group may include any number of component carriers, or any number of time intervals (e.g., slots), or a combination thereof. As described with reference to FIGS. 3 and 4, a DCI format 700 may include DCI fields 710 that are group-specific such as dedicated DCI fields 710-*a* and 710-*b*. Dedicated DCI field 710-*a* may include data transmission parameters that are specific to a first unit group, and dedicated DCI field 710-*b* may include data transmission parameters that are specific to a second unit group. DCI format 700 may also include bit-maps or RIV DCI fields 710 for each group. Bit-map/RIV DCI field 705-*a* may include a bit-map or an RIV field that indicates which units of a first group are scheduled for data transmissions, and bit-map/RIV DCI field 705-*b* may include a bit-map or an RIV field that indicates which units of a second group are scheduled for data transmissions. DCI format 700 may also include a joint DCI field 715 that includes parameters that apply to both the first group and the second group.

In some cases, DCI format 700 may include FDRA fields that are separate for each group (e.g., group-specific) or joint for each group. For example, one or more FDRA fields may be included in dedicated DCI field 710-*a*, 710-*b*, or both resulting in separate FDRA fields. In some cases, the resource allocation (e.g., physical resource block allocation) for each unit in a group may be the same and the FDRA fields may group-specific, where the FDRA field in each dedicated DCI field 710 may indicate the resource allocations for each group or each unit in a group. Additionally or alternatively, one or more FDRA fields may be included in joint DCI field 715 for both the first unit group and the second unit group, resulting in a joint FDRA field. In such a configuration, an FDRA codepoint may indicate a resource allocation (e.g., physical resource block (PRB) resource allocation) for each unit in the first unit group and a resource allocation (e.g., PRB resource allocation) for each unit in the second unit group. The mapping between the FDRA codepoint and the resource allocations for the first unit group and the second unit group may be configured semi-statically, such as through RRC signaling.

In some cases, DCI format 700 may include TDRA fields that are separate for each group (e.g., group-specific) or joint for each group. For example, one or more TDRA fields may be included in dedicated DCI field 710-*a*, DCI field 710-*b*, or both resulting in separate TDRA fields. In such cases, some time dependent indicators (e.g., SLIV) may be the same for all the units in each unit group. As such, the indicators (e.g., SLIV) may be indicated by the TDRA field for the first unit group and the second unit group, separately. In some other cases, some time dependent indicators, such as K0 and/or K2, may increment with each slot progression. As such, these indicators (e.g., K0 and/or K2 values) may be indicated by the TDRA field for each unit group for the first slot of the unit group. Based on the indication of the K0 and/or K2 values of the first slot of each group, the UE may increment the K0/K2 values for each subsequent slot for each unit group. Additionally or alternatively, one or more TDRA fields may be included in a joint DCI field 715 for the first unit group and the second unit group. In such cases, a TDRA codepoint may indicate time dependent indicators (e.g., SLIV and K0 for downlink data transmissions, SLIV and K2 for uplink data transmissions) for each unit in the first slot of the first unit group and time dependent indicators (e.g., SLIV and K0 for downlink data transmissions, SLIV and K2 for uplink data transmissions) for each unit in the first slot of the second unit group. The mapping between the TDRA codepoint and the time dependent indicators (e.g., SLIV, K0, K2) of the first slot for the first unit group and the time dependent indicators (e.g., SLIV, K0, K2) of the first slot for the second unit group may be configured semi-statically, such as by RRC signaling.

In some cases, DCI format 700 may include HARQ ID fields that are separate for each group (e.g., group-specific) or joint for each group. Across component carriers in the same group, the HARQ ID field may be the same. Across slots within the same group, the HARQ ID may increment with each slot progression. As such, the HARQ ID indication (e.g., a separate indication for each group, or a joint indication that applies to each group) may be for the first slot in a group. To determine the subsequent slots in the group, a UE may increment the HARQ IDs with a modulo operation, such as a modulo 16 operation.

Figure 8:
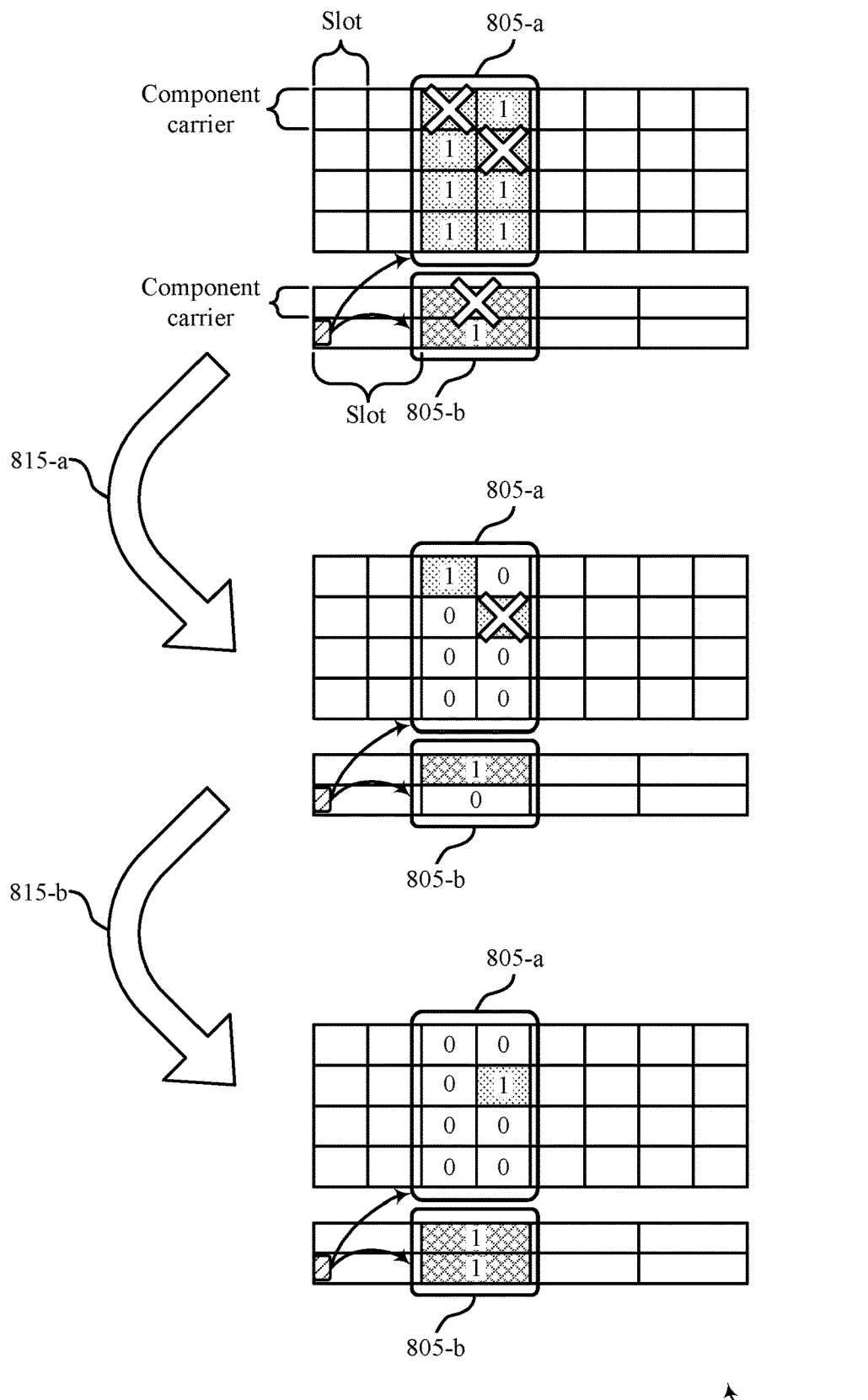
FIG. 8 illustrates an example of a data retransmission procedure that supports DCI for scheduling multiple component carriers in accordance with aspects of the present disclosure.

FIG. 8 illustrates an example of a data retransmission procedure 800 that supports DCI for scheduling multiple component carriers in accordance with aspects of the present disclosure. Data retransmission procedure 800 may be performed by a base station or a UE, or both, which may be examples of a base station and a UE as described with reference to FIGS. 1 through 7. In some cases, a base station may implement a multi-component carrier scheduling procedure with a UE that includes performing data retransmission procedure 800 with the UE. Additionally or alternatively, other wireless devices, such as a UE, may implement the multi-component carrier scheduling procedure and perform or participate in data retransmission procedure 800.

In some cases, a base station may include a new data indicator (NDI) in DCI that includes one or more bits to indicate to the UE whether the data scheduled on one or more units of one or more groups is new data, or whether the data transmissions are retransmissions. If the NDI is toggled, such that the current NDI bit value is different from the previous NDI bit value, then new data is scheduled. If the NDI is not toggled, such that the current NDI bit value is the same as the previous NDI bit value, then the data is a retransmission. The NDI may be indicated for each group and, in some cases, may be indicated for each unit within a group.

In some cases, to mitigate the number of bits used for each NDI and to maintain flexible scheduling, the bit-map and/or RIV field included in the DCI format as described with reference to FIGS. 5 through 7, may be used for NDI. For example, physical control channel 810 (e.g., DCI) may include an NDI field for each configured group, such as an NDI field for a first group, and a second NDI field for a second group. The DCI may also include a bit-map or RIV field for each group. In some cases, as depicted in the top example of FIG. 8, a UE or a base station, or both may determine that three data transmission errors occurred (e.g., two errors in group 805-*a* and one error in group 805-*b*), where either the UE or the base station was not able to successfully decode a scheduled data transmissions. In either case, the base station may determine which units resulted in errors (for example, based on HARQ feedback). At 815-*a*, the base station may determine to not toggle the NDI for group 805-*a* and not toggle the NDI for group 805-*b*. To avoid unnecessary retransmissions of all units in each group, the base station may also use the bit-map or RIV field in the DCI format to indicate which of the units may be retransmitted, where the data mapped to a unit is fixed between the initial transmission and re-transmissions. In the bit-map case, as depicted in FIG. 8, the base station may indicate 1 for the units to be retransmitted, and a 0 for the units not to be retransmitted. As such, at 815-*a*, base station may not toggle the NDI field for group 805-*a* or 805-*b*, and indicate a bit-map for group 805-*a* that includes two 1's, and a bit-map for group 805-*b* that includes one 1, where the 1's are associated with the unsuccessful transmission units. Based on the DCI format, the UE may transmit or receive the three retransmissions in the associated units, where no other data is received in the other units.

In some cases, following the retransmission at 815-*a*, all or a subset of the retransmissions may be successfully received, or all or a subset of the retransmissions may not be successfully received. For example, one unit from group 805-*a* following 815-*a* may result in an unsuccessful retransmission. At 815-*b*, the base station may determine to not toggle the NDI for group 805-*a* because one unit resulted in an unsuccessful retransmission and the base station may determine to toggle the NDI for group 805-*b* because each unit of group 805-*a* resulted in successful transmissions. The base station may configure a bit-map or RIV for group 805-*a* that indicates the certain unit that may to be retransmitted. The base station may also configure a bit-map or RIV for group 805-*b* that indicates new data transmissions for the units of group 805-*b*. The UE may receive the DCI from the base station and identify the un-toggled NDI and bit-map or RIV for group 805-*a* and determine that one data retransmission is scheduled for a unit of group 805-*a*, and identify the toggled NDI and bit-map or RIV for group 805-*b* and determine that up to two new data transmissions are scheduled for group 805-*b*. Based on the identified information, the UE may transmit of receive the retransmission in the associated unit of group 805-*a* and transmit or receive the new transmissions scheduled in group 805-*b*.

In some implementations, for a semi-static HARQ ACK codebook (e.g., HARQ codebook type 1), irrespective of the bit-map or RIV for a group, the UE may generate HARQ ACK bits for each possibly scheduled unit in a group. Additionally or alternatively, between groups, control channel (e.g., PUCCH) resources for HARQ ACK may be common between groups or separate across groups.

In some implementations, for a dynamic HARQ ACK codebook (e.g., HARQ codebook type 2), the number of HARQ ACK bits may be based on the number of scheduled units in the group (e.g., indicated by the bit-map or RIV). In some cases, downlink assignment index (DAI) counting is per unit, where DAI may be incremented by one for each unit that is scheduled in a group. In some cases, DAI counting is per component carrier in a group, where DAI is incremented by one if one or more slots in a component carrier are scheduled in a group. In some implementations, HARQ ACK bundling per component carrier may be applied. In some cases, DAI counting is per group, where DAI is incremented by if one or more units are scheduled in a group. In some implementations, HARQ-ACK bundling per group may be applied.

Figure 9:
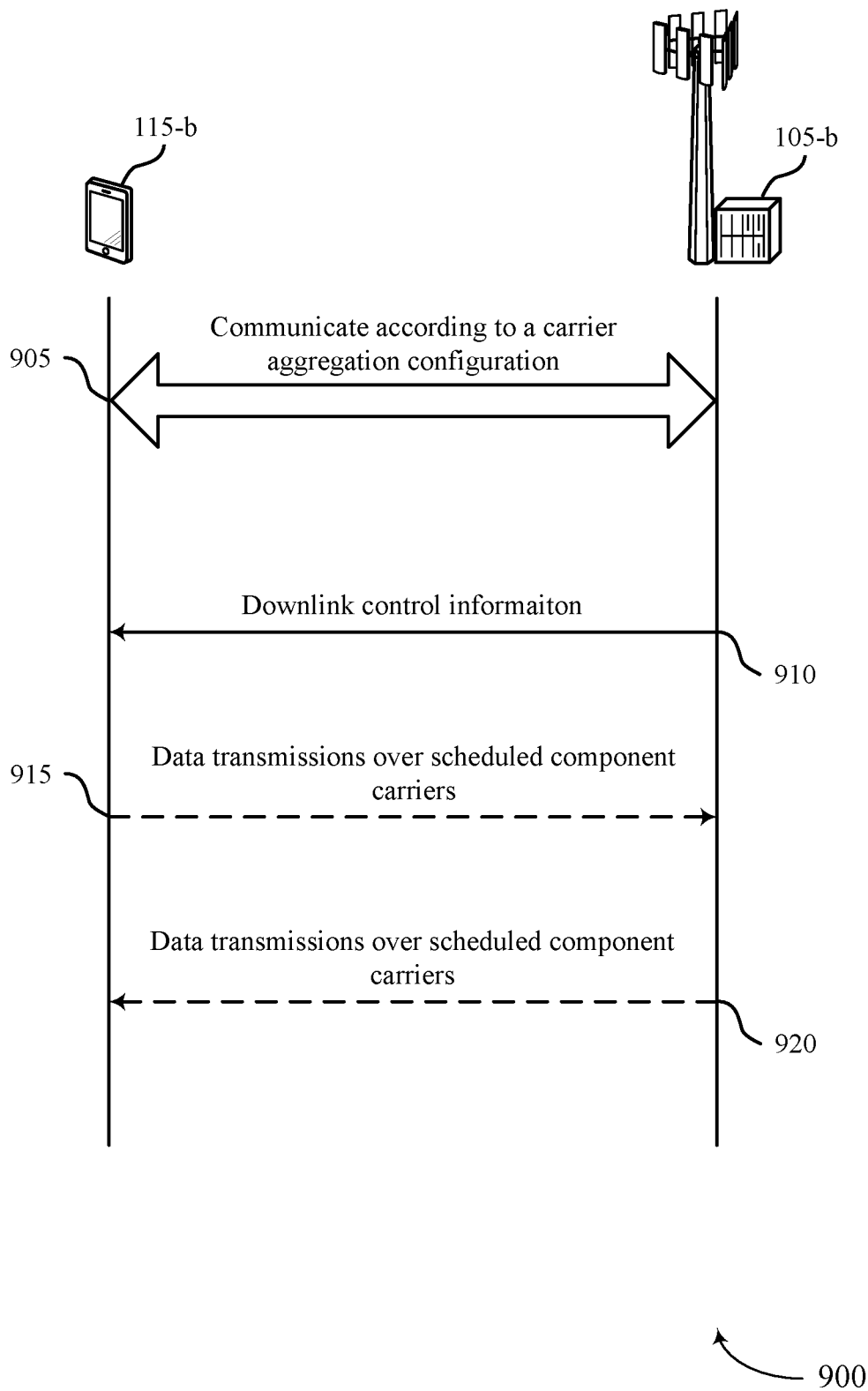
FIG. 9 illustrates an example of a process flow that supports DCI for scheduling multiple component carriers in accordance with aspects of the present disclosure.

FIG. 9 illustrates an example of a process flow 900 that supports DCI for scheduling multiple component carriers in accordance with aspects of the present disclosure. The process flow 900 may illustrate an example multiple component carrier scheduling procedure. For example, base station 105-*b* may determine to schedule one or more component carriers or one or more time intervals for data transmissions and indicate the scheduling to UE 115-*b*. Base station 105-*b* and UE 115-*b* may be examples of the corresponding wireless devices described with reference to FIGS. 1 through 8. In some cases, instead of base station 105-*b* implementing the component carrier scheduling procedure, a different type of wireless device (e.g., a UE 115) may perform the procedure. Alternative examples of the following may be implemented, where some steps are performed in a different order than described or are not performed at all. In some cases, steps may include additional features not mentioned below, or further steps may be added.

At 905, UE 115-*b* may communicate with base station 105-*b* over a set of component carriers according to a carrier aggregation configuration. The set of component carriers may include one or more DSS carriers, one or more non-DSS carriers, one or more SCell, or one or more PCells, or a combination thereof.

At 910, UE 115-*b* may receive, from base station 105-*b* based on connecting to the base station, DCI including one or more fields that are common to multiple (e.g., two or more) component carriers from the set of component carriers. The DCI may schedule a set of data transmissions over the two or more component carriers. In some cases, the multiple component carriers may be a group of component carriers, where the group may additionally or alternatively include one or more time intervals (e.g., TTIs, slots) of each component carrier in the group. For example, the DCI may schedule the set of data transmissions over the two or more component carriers for a set of TTIs (e.g., one or more). As such, the group may include a set of units including one or more component carriers, or one or more time intervals, or a combination thereof.

In some cases, the DCI may include DCI fields for multiple groups. For example, the DCI may include one or more fields that are common to a first group, and one or more different fields (e.g., second set of fields) that are common to a second group. The second set of fields may schedule a second set of data transmissions. The component carriers of the first group may have a first subcarrier spacing, and the component carriers of the second group may have a second subcarrier spacing, where the first and second subcarrier spacings are different. The subcarrier spacing of component carriers within a group may be the same. In some cases, the first set of one or more fields and the second set of one or more fields share a field indicating a first parameter for the first set of data transmissions over the first set of component carriers and a second parameter for the second set of data transmissions over the second set of two or more component carriers. The first parameter may be different from the second parameter. UE 115-*b* may receive a configuration message from base station 105-*b* indicating a mapping from the shared field to the first parameter and the second parameter. The first parameter and the second parameter may be FDRA parameters, TDRA parameters, or both.

UE 115-a may receive, from base station 105-b, a configuration message indicating the group of component carriers including at least the two or more component carriers, where receiving the DCI scheduling the set of data transmissions is based on receiving the configuration message indicating the two or more component carriers. The configuration message may be received before the DCI. In some cases, base station 105-b may transmit the configuration message semi-statically, such as in an RRC message.

In some cases, not all units in the group may be scheduled by each DCI. In such cases, UE 115-a may receive an indication of a subset of units (e.g., component carriers, time intervals) from the group, where the subset of units may include the two or more component carriers. In some cases, transmitting or receiving the set of data transmissions over the two or more component carriers is based on receiving the indication of the subset of units. In some implementations, UE 115-a may receive a bitmap indicating the two or more component carriers (and/or one or more time intervals) from the group of component carriers (and/or one or more time intervals). In some implementations, UE 115-b may receive an indication of a quantity of contiguous units (e.g., component carriers, time intervals), from the group of units, within the subset of units, where the quantity of contiguous units may indicate which component carriers and/or time intervals of the group are scheduled. The quantity of units may be indicated by an RIV field in the DCI. In some cases, UE 115-b may identify which units are scheduled based on an order associated with the RIV field. The order may be a frequency first order, or a time first order.

In some cases, UE 15-b may receive a configuration message (e.g., via RRC signaling) indicating a set of parameters for each of the two or more component carriers or time intervals, where the set of parameters for each of the two or more component carriers are the same. Receiving the DCI may be based on receiving the configuration message. In some cases, UE 115-b may receive a configuration message indicating a first set of parameters for a first component carrier (and/or a first unit) of the two or more component carriers, and UE 115-b may identify a set of parameters for remaining component carriers of the two or more component carriers based on the first set of parameters. The first set of parameters for the first component carrier and the set of parameters for the remaining component carriers may be the same, and receiving the DCI may be based on receiving the configuration message.

In some cases, UE 115-b may identify, based on receiving the DCI, a first identifier for a first HARQ (e.g., HARQ ID) associated with the set of data transmissions during a first TTI of the set of TTIs, and increment the first identifier to generate a second identifier for a second HARQ associated with the set of data transmissions during a second TTI of the set of TTIs. In some implementations, UE 115-b may identify, based on receiving the DCI, a first timing parameter (e.g., K0, K2) for transmitting a first HARQ associated with the set of data transmissions during a first TTI of the set of TTIs, and increment the first timing parameter to generate a second timing parameter for transmitting a second HARQ associated with the plurality of data transmissions during a second TTI of the set of TTIs.

At 915, if the DCI scheduled a set of uplink data transmissions, UE 115-b may transmit the set of data transmissions over the scheduled two or more component carriers and/or over one or more time intervals based on receiving the DCI. In some cases, UE 115-a may transmit a second set of data transmissions over a second set of component carriers based on the DCI include a second set of fields that are common to the second set of component carriers.

At 920, if the DCI scheduled a set of downlink data transmissions, UE 115-b may receive the set of data transmissions over the scheduled two or more component carriers and/or over one or more time intervals based on receiving the DCI. In some cases, UE 115-a may receive a second set of data transmissions over a second set of component carriers based on the DCI include a second set of fields that are common to the second set of component carriers.

In some cases, UE 115-b may attempt to decode a set of downlink transmissions of the set of data transmissions, and transmit, to base station 105-b, acknowledgement information (e.g., ACK/NACK feedback) associated with the set of downlink transmissions. The acknowledgement information may include a single bit associated with the two or more component carriers, a set of bits each associated with one of the two or more component carriers, or a set of bits each associated with a TTI (e.g., time interval, slot) of one of the two or more component carriers.

Figure 10:
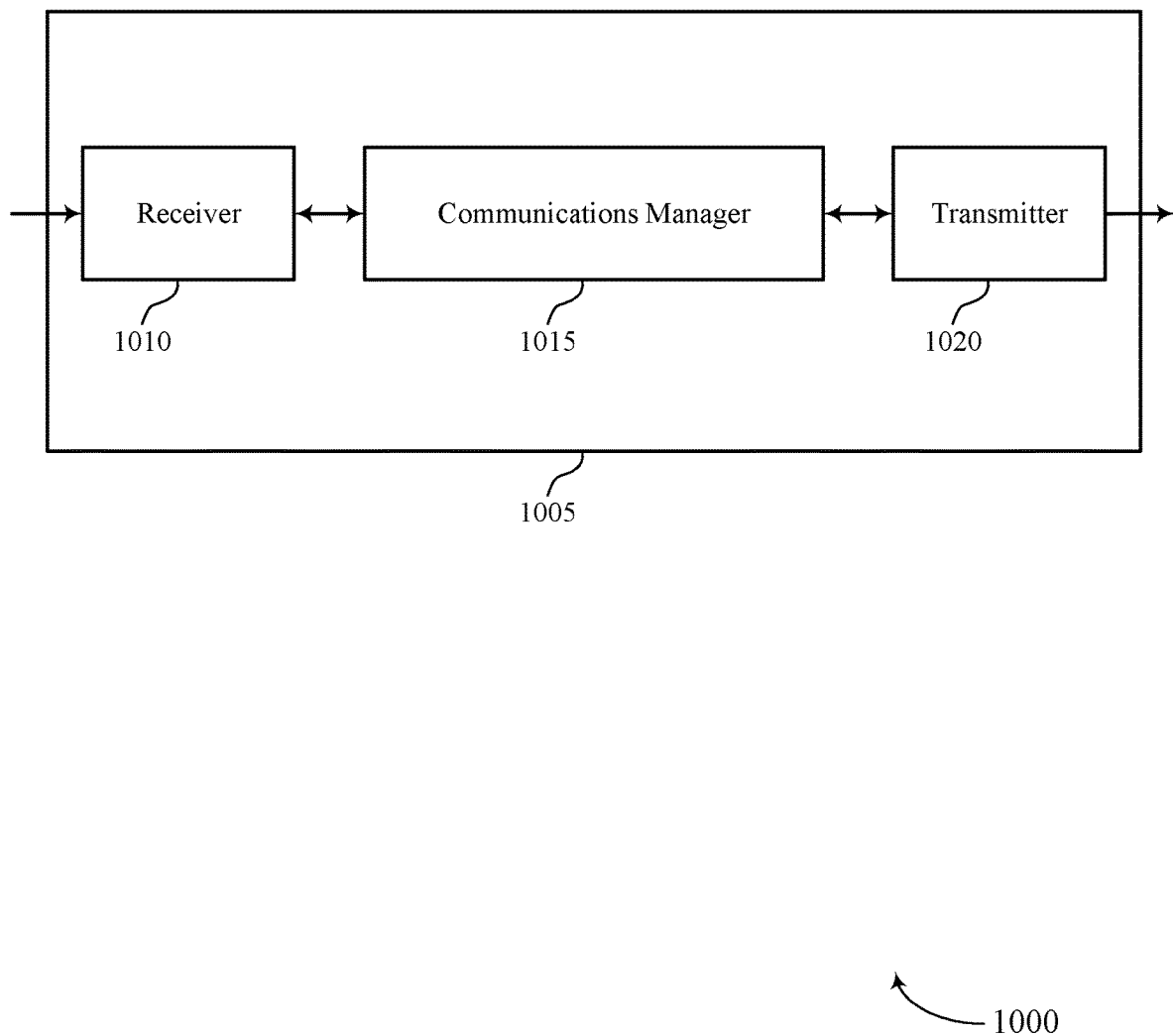
FIGS. 10 and 11 show block diagrams of devices that support DCI for scheduling multiple component carriers in accordance with aspects of the present disclosure.

FIG. 10 shows a block diagram 1000 of a device 1005 that supports DCI for scheduling multiple component carriers in accordance with aspects of the present disclosure. The device 1005 may be an example of aspects of a UE 115 as described herein. The device 1005 may include a receiver 1010, a communications manager 1015, and a transmitter 1020. The device 1005 may also include at least one processor. Each of these components may be in communication with one another (e.g., via one or more buses).

The receiver 1010 may receive information such as packets, user data, or control information associated with various information channels (e.g., control channels, data channels, and information related to DCI for scheduling multiple component carriers). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may communicate with a base station over a set of component carriers according to a carrier aggregation configuration, receive, from the base station based on connecting to the base station, DCI including one or more fields that are common to two or more component carriers from the set of component carriers, the DCI scheduling a set of data transmissions over the two or more component carriers, and transmit or receive the set of data transmissions over the scheduled two or more component carriers based on receiving the DCI. The communications manager 1015 may be an example of aspects of the communications manager 1310 described herein.

The communications manager 1015, or its sub-components, may be implemented in hardware, code (e.g., software) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

The actions performed by the UE communications manager 1015 as described herein may be implemented to realize one or more potential advantages (e.g., at a modem of the UE 115). One implementation may allow a UE 115 to reduce control signaling overhead by decreasing a quantity of DCI transmissions necessary to schedule data transmissions over multiple component carriers. Another implementation may provide improved efficiency and throughput, as a number of separate resources allocated to control signaling (e.g., DCI) for the UE 115 may be reduced.

Figure 11:
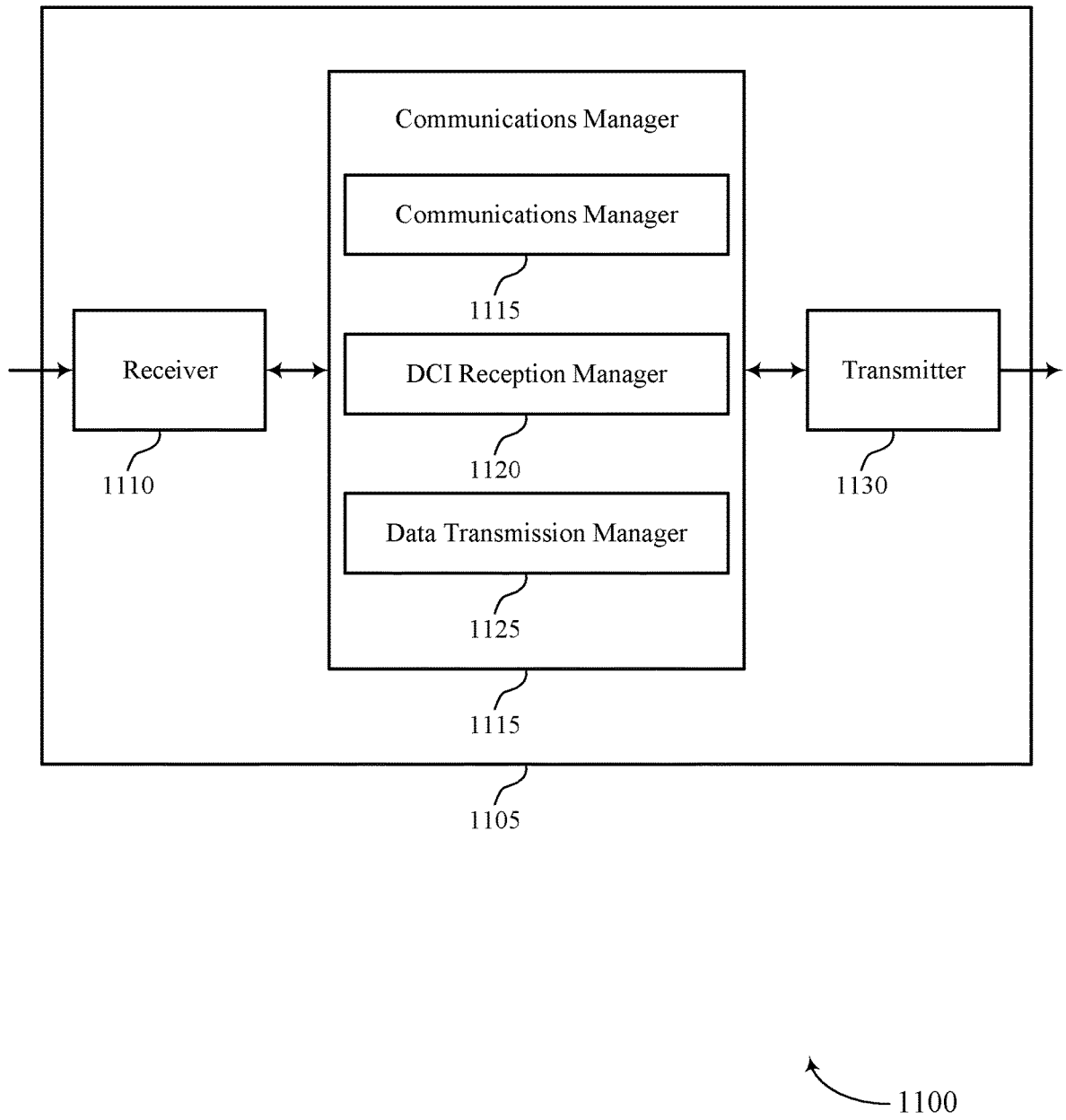

FIG. 11 shows a block diagram 1100 of a device 1105 that supports DCI for scheduling multiple component carriers in accordance with aspects of the present disclosure. The device 1105 may be an example of aspects of a device 1005, or a UE 115 as described herein. The device 1105 may include a receiver 1110, a communications manager 1115, and a transmitter 1130. The device 1105 may also include at least one processor. Each of these components may be in communication with one another (e.g., via one or more buses).

The receiver 1110 may receive information such as packets, user data, or control information associated with various information channels (e.g., control channels, data channels, and information related to DCI for scheduling multiple component carriers). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a communications manager 1115, a DCI reception manager 1120, and a data transmission manager 1125. The communications manager 1115 may be an example of aspects of the communications manager 1310 described herein.

The communications manager 1115 may communicate with a base station over a set of component carriers according to a carrier aggregation configuration. The DCI reception manager 1120 may receive, from the base station based on connecting to the base station, DCI including one or more fields that are common to two or more component carriers from the set of component carriers, the DCI scheduling a set of data transmissions over the two or more component carriers. The data transmission manager 1125 may transmit or receive the set of data transmissions over the scheduled two or more component carriers based on receiving the DCI.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
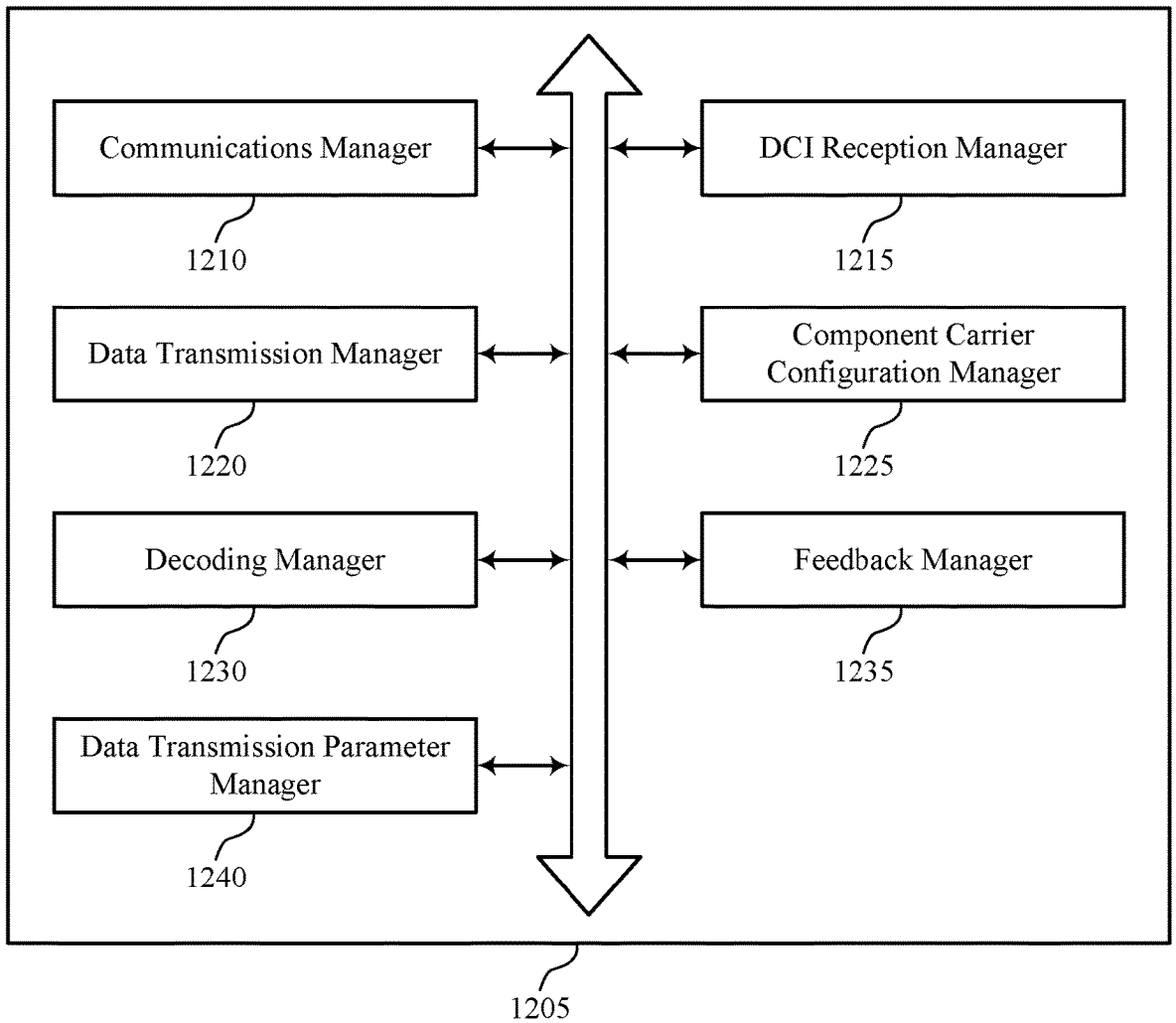
FIG. 12 shows a block diagram of a communications manager that supports DCI for scheduling multiple component carriers in accordance with aspects of the present disclosure.

FIG. 12 shows a block diagram 1200 of a communications manager 1205 that supports DCI for scheduling multiple component carriers in accordance with aspects of the present disclosure. The communications manager 1205 may be an example of aspects of a communications manager 1015, a communications manager 1115, or a communications manager 1310 described herein. The communications manager 1205 may include a communications manager 1210, a DCI reception manager 1215, a data transmission manager 1220, a component carrier configuration manager 1225, a decoding manager 1230, a feedback manager 1235, and a data transmission parameter manager 1240. Each of these modules may communicate, directly or indirectly, with one another (e.g., via one or more buses).

The communications manager 1210 may communicate with a base station over a set of component carriers according to a carrier aggregation configuration. The DCI reception manager 1215 may receive, from the base station based on connecting to the base station, DCI including one or more fields that are common to two or more component carriers from the set of component carriers, the DCI scheduling a set of data transmissions over the two or more component carriers. The data transmission manager 1220 may transmit or receive the set of data transmissions over the scheduled two or more component carriers based on receiving the DCI.

The component carrier configuration manager 1225 may receive, from the base station, a configuration message indicating a group of component carriers including at least the two or more component carriers, where receiving the DCI scheduling the set of data transmissions is based on receiving the configuration message indicating the two or more component carriers. In some examples, the component carrier configuration manager 1225 may receive an indication of a subset of component carriers from the group of component carriers, the subset of component carriers including the two or more component carriers, where transmitting or receiving the set of data transmissions over the two or more component carriers is based on receiving the indication of the subset of component carriers.

In some examples, the component carrier configuration manager 1225 may receive a bitmap indicating the two or more component carriers from the group of component carriers. In some examples, the component carrier configuration manager 1225 may receive an indication of a first component carrier, from the group of component carriers, within the subset of component carriers. In some examples, the component carrier configuration manager 1225 may receive an indication of a quantity of contiguous component carriers, from the group of component carriers, within the subset of component carriers. In some cases, the indication of the subset of component carriers is based on an order of resources associated with the group of component carriers. In some cases, the order is a frequency-first order or a time-first order. In some cases, the group of component carriers is the two or more component carriers.

In some examples, the component carrier configuration manager 1225 may receive a configuration message indicating a set of parameters for each of the two or more component carriers, where the set of parameters for each of the two or more component carriers are the same, and where receiving the DCI is based on receiving the configuration message.

In some examples, the component carrier configuration manager 1225 may receive a configuration message indicating a first set of parameters for a first component carrier of the two or more component carriers. In some examples, the component carrier configuration manager 1225 may identify a set of parameters for remaining component carriers of the two or more component carriers based on the first set of parameters, where the first set of parameters for the first component carrier and the set of parameters for the remaining component carriers are the same, and where receiving the DCI is based on receiving the configuration message.

The decoding manager 1230 may attempt to decode a set of downlink transmissions of the set of data transmissions. The feedback manager 1235 may transmit, to the base station, acknowledgement information associated with the set of downlink transmissions, where the acknowledgement information includes a single bit associated with the two or more component carriers, a set of bits each associated with one of the two or more component carriers, or a set of bits each associated with a TTI of one of the two or more component carriers.

In some cases, the DCI schedules the set of data transmissions over the two or more component carriers for a set of TTIs. The data transmission parameter manager 1240 may identify, based on receiving the DCI, a first identifier for a first HARQ associated with the set of data transmissions during a first TTI of the set of TTIs. In some examples, the data transmission parameter manager 1240 may increment the first identifier to generate a second identifier for a second HARQ associated with the set of data transmissions during a second TTI of the set of TTIs. In some examples, the data transmission parameter manager 1240 may identify, based on receiving the DCI, a first timing parameter for transmitting a first HARQ associated with the set of data transmissions during a first TTI of the set of TTIs. In some examples, the data transmission parameter manager 1240 may increment the first timing parameter to generate a second timing parameter for transmitting a second HARQ associated with the set of data transmissions during a second TTI of the set of TTIs.

In some cases, the two or more component carriers are a first set of component carriers. In some cases, the one or more fields that are common to the first set of component carriers are a first set of one or more fields. In some cases, the set of data transmissions over the first set of component carriers is a first set of data transmissions. In some cases, the DCI includes a second set of one or more fields that are common to a second set of two or more component carriers. In some cases, the DCI schedules a second set of data transmissions over the second set of two or more component carriers.

In some examples, the data transmission manager 1220 may transmit or receive the second set of data transmissions over the second set of two or more component carriers based on receiving the DCI including the second set of one or more fields that are common to the second set of two or more component carriers.

In some cases, the first set of one or more fields and the second set of one or more fields share a field indicating a first parameter for the first set of data transmissions over the first set of component carriers and a second parameter for the second set of data transmissions over the second set of two or more component carriers. In some cases, the first parameter is different from the second parameter.

In some examples, the component carrier configuration manager 1225 may receive a configuration message from the base station indicating a mapping from the shared field to the first parameter and the second parameter. In some cases, the first parameter and the second parameter are FDRA parameters, TDRA parameters, or both.

In some cases, a first component carrier of the two or more component carriers has a first subcarrier spacing. In some cases, a second component carrier of the two or more component carriers has a second subcarrier spacing different from the first subcarrier spacing.

Figure 13:
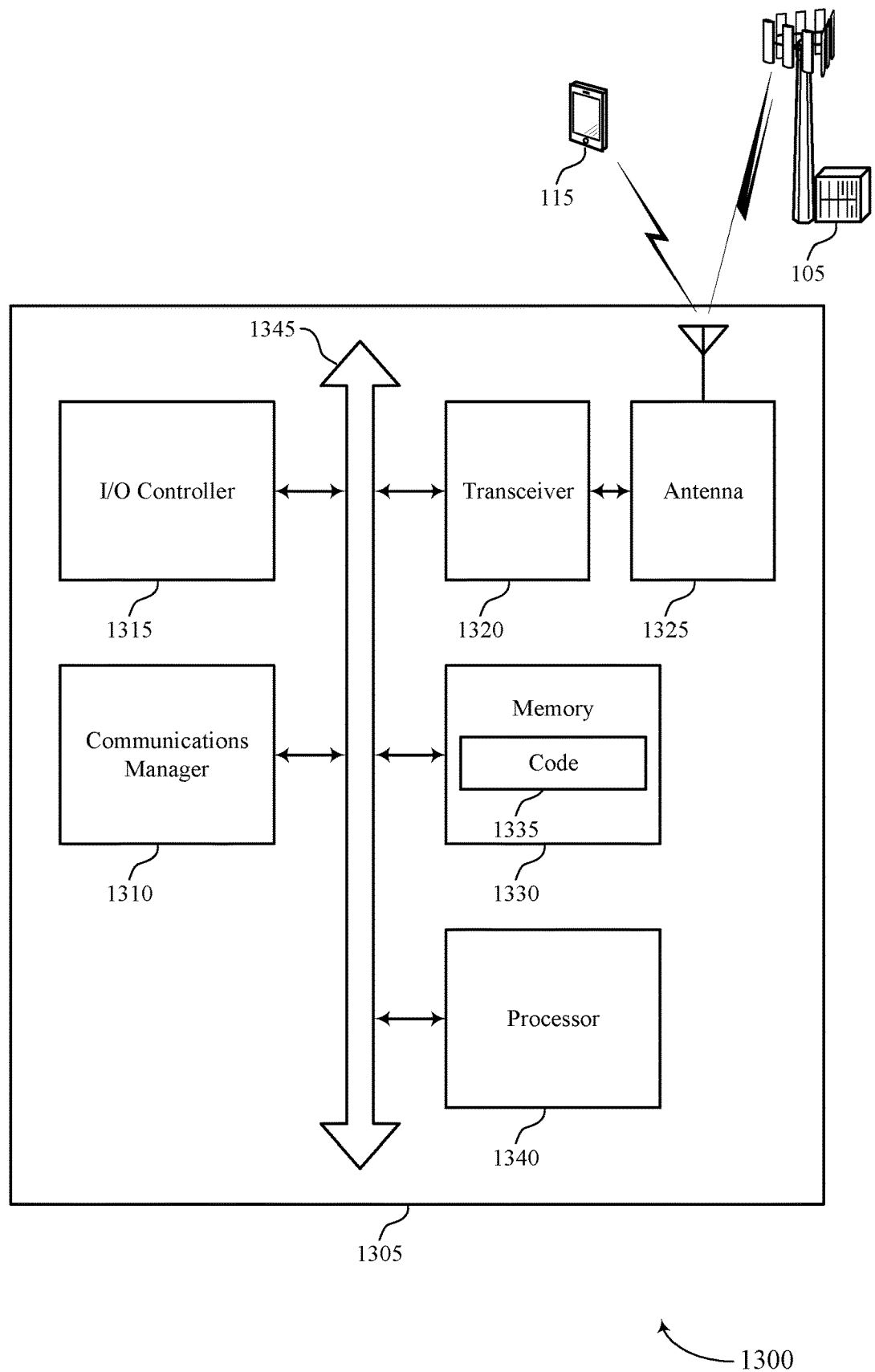
FIG. 13 shows a diagram of a system including a device that supports DCI for scheduling multiple component carriers in accordance with aspects of the present disclosure.

FIG. 13 shows a diagram of a system 1300 including a device 1305 that supports DCI for scheduling multiple component carriers in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may communicate with a base station over a set of component carriers according to a carrier aggregation configuration, receive, from the base station based on connecting to the base station, DCI including one or more fields that are common to two or more component carriers from the set of component carriers, the DCI scheduling a set of data transmissions over the two or more component carriers, and transmit or receive the set of data transmissions over the scheduled two or more component carriers based on receiving the DCI.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include a hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting DCI for scheduling multiple component carriers).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The actions performed by the UE communications manager 1310 as described herein may be implemented to realize one or more potential advantages (e.g., at a handset of the UE 115). One implementation may allow a UE 115 to save power and increase battery life by avoiding having to receive multiple DCI transmissions to schedule data transmissions over multiple component carriers. Additionally, a throughput and efficiency associated with the UE 115 may be increased due to a decrease of signaling overhead (e.g., a decrease in DCI signaling).

Figure 14:
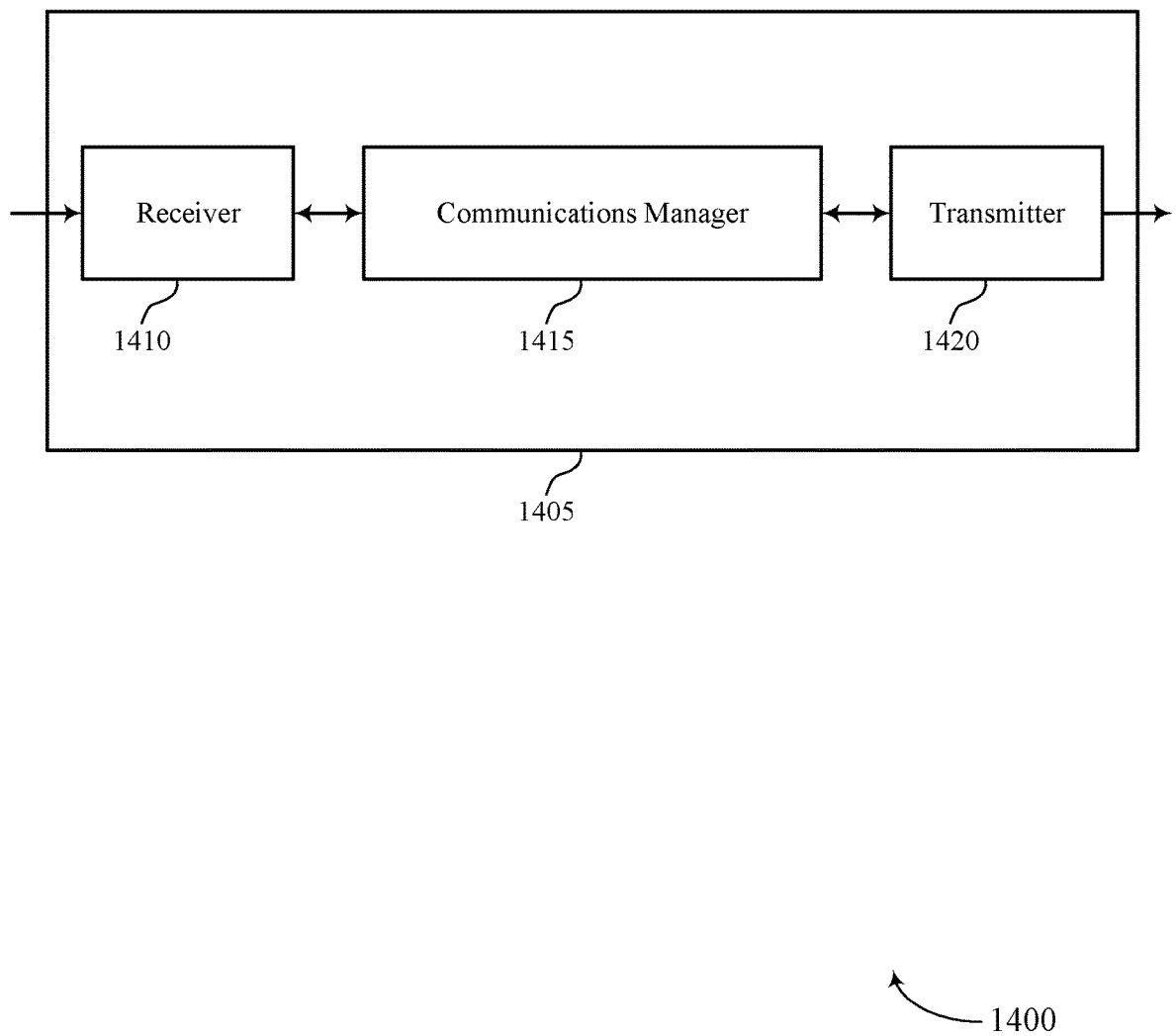
FIGS. 14 and 15 show block diagrams of devices that support DCI for scheduling multiple component carriers in accordance with aspects of the present disclosure.

FIG. 14 shows a block diagram 1400 of a device 1405 that supports DCI for scheduling multiple component carriers in accordance with aspects of the present disclosure. The device 1405 may be an example of aspects of a base station 105 as described herein. The device 1405 may include a receiver 1410, a communications manager 1415, and a transmitter 1420. The device 1405 may also include at least one processor. Each of these components may be in communication with one another (e.g., via one or more buses).

The receiver 1410 may receive information such as packets, user data, or control information associated with various information channels (e.g., control channels, data channels, and information related to DCI for scheduling multiple component carriers). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may communicate with a UE over a set of component carriers according to a carrier aggregation configuration, transmit, to the UE based on connecting with the UE, DCI including one or more fields that are common to two or more component carriers from the set of component carriers, the DCI scheduling a set of data transmissions over the two or more component carriers, and transmit or receive the set of data transmissions over the scheduled two or more component carriers based on transmitting the DCI. The communications manager 1415 may be an example of aspects of the communications manager 1710 described herein.

The communications manager 1415, or its sub-components, may be implemented in hardware, code (e.g., software) executed by a processor, or any combination thereof. If implemented in code executed by a processor, the functions of the communications manager 1415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

In some cases, the actions performed by the communications manager 1415 may be implemented to realize one or more potential advantages. One implementation may allow the base station 105 to save power and increase batter life by avoiding having to transmit multiple DCI transmissions to schedule data transmissions over multiple component carriers. Another implementation may provide improved throughput and efficiency due to a decreased signaling overhead associated with scheduling data transmissions over multiple component carriers.

Figure 15:
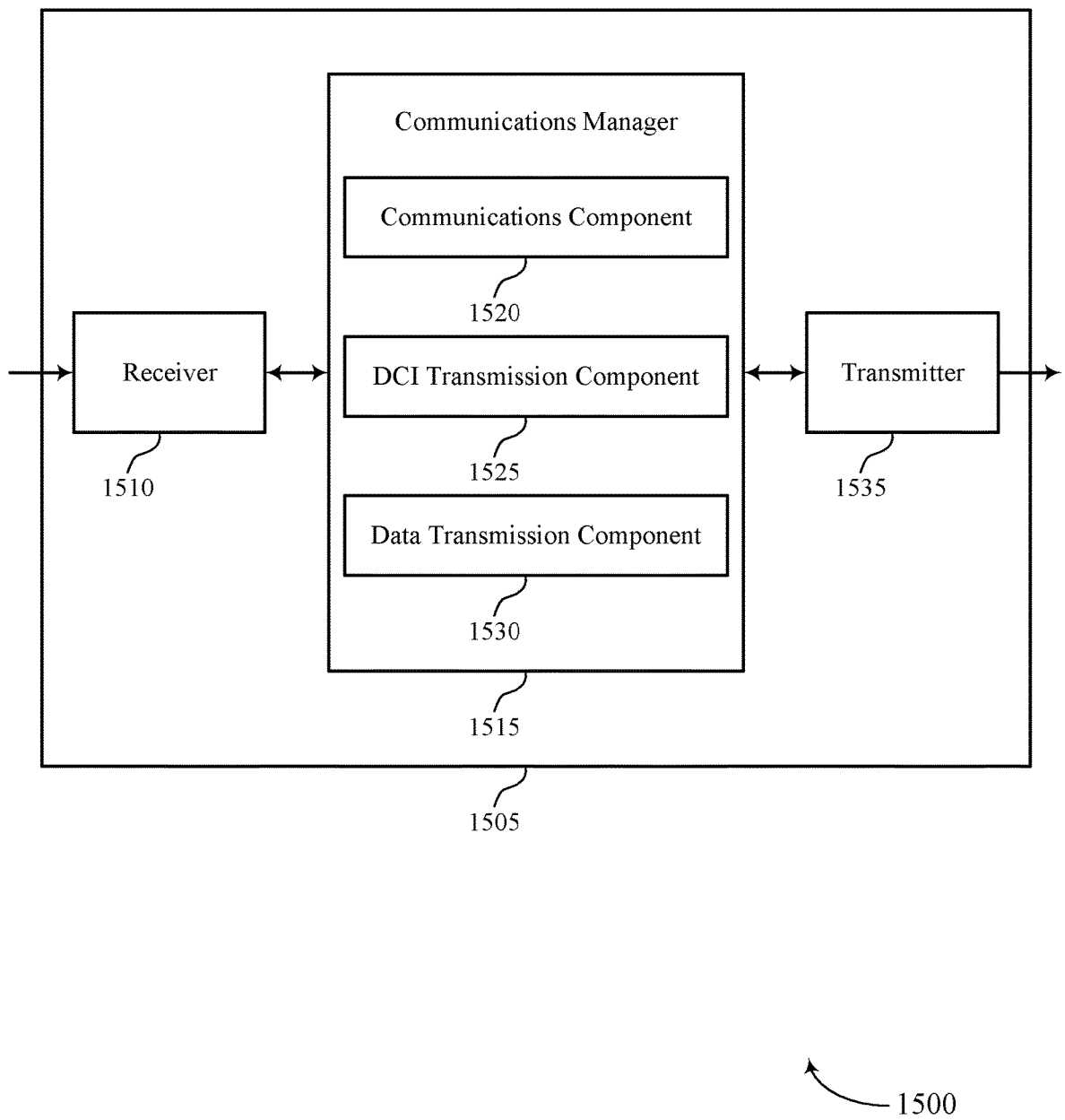

FIG. 15 shows a block diagram 1500 of a device 1505 that supports DCI for scheduling multiple component carriers in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include at least one processor. Each of these components may be in communication with one another (e.g., via one or more buses).

The receiver 1510 may receive information such as packets, user data, or control information associated with various information channels (e.g., control channels, data channels, and information related to DCI for scheduling multiple component carriers). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a communications component 1520, a DCI transmission component 1525, and a data transmission component 1530. The communications manager 1515 may be an example of aspects of the communications manager 1710 described herein.

The communications component 1520 may communicate with a UE over a set of component carriers according to a carrier aggregation configuration. The DCI transmission component 1525 may transmit, to the UE based on connecting with the UE, DCI including one or more fields that are common to two or more component carriers from the set of component carriers, the DCI scheduling a set of data transmissions over the two or more component carriers. The data transmission component 1530 may transmit or receive the set of data transmissions over the scheduled two or more component carriers based on transmitting the DCI.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
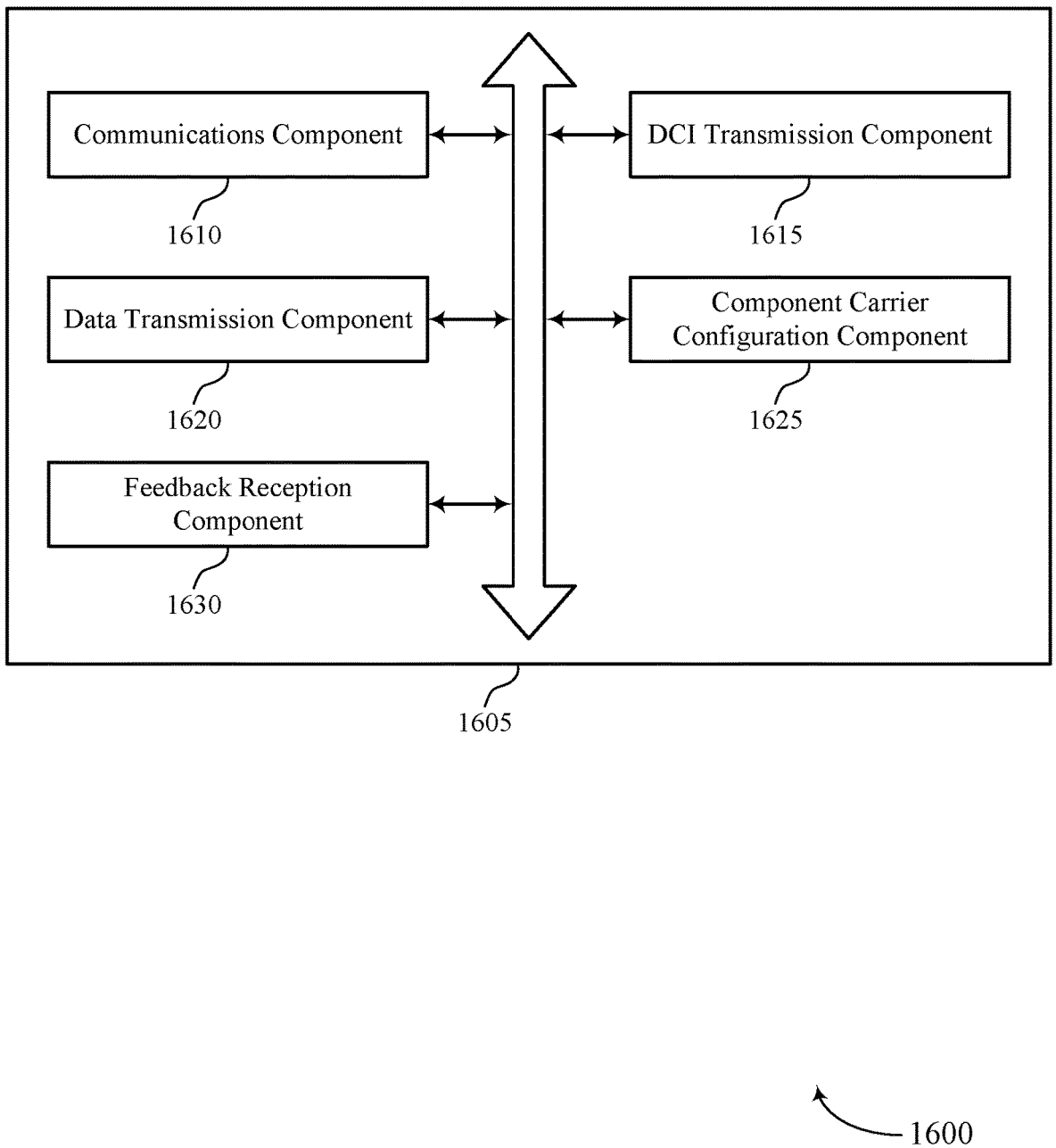
FIG. 16 shows a block diagram of a communications manager that supports DCI for scheduling multiple component carriers in accordance with aspects of the present disclosure.

FIG. 16 shows a block diagram 1600 of a communications manager 1605 that supports DCI for scheduling multiple component carriers in accordance with aspects of the present disclosure. The communications manager 1605 may be an example of aspects of a communications manager 1415, a communications manager 1515, or a communications manager 1710 described herein. The communications manager 1605 may include a communications component 1610, a DCI transmission component 1615, a data transmission component 1620, a component carrier configuration component 1625, and a feedback reception component 1630. Each of these modules may communicate, directly or indirectly, with one another (e.g., via one or more buses).

The communications component 1610 may communicate with a UE over a set of component carriers according to a carrier aggregation configuration. The DCI transmission component 1615 may transmit, to the UE based on connecting with the UE, DCI including one or more fields that are common to two or more component carriers from the set of component carriers, the DCI scheduling a set of data transmissions over the two or more component carriers. The data transmission component 1620 may transmit or receive the set of data transmissions over the scheduled two or more component carriers based on transmitting the DCI.

The component carrier configuration component 1625 may transmit, to the UE, a configuration message indicating a group of component carriers including at least the two or more component carriers, where transmitting the DCI scheduling the set of data transmissions is based on transmitting the configuration message indicating the two or more component carriers. In some examples, the component carrier configuration component 1625 may transmit an indication of a subset of component carriers from the group of component carriers, the subset of component carriers including the two or more component carriers, where transmitting or receiving the set of data transmissions over the two or more component carriers is based on transmitting the indication of the subset of component carriers.

In some examples, the component carrier configuration component 1625 may transmit a bitmap indicating the two or more component carriers from the group of component carriers. In some examples, the component carrier configuration component 1625 may transmit an indication of a first component carrier, from the group of component carriers, within the subset of component carriers. In some examples, the component carrier configuration component 1625 may transmit an indication of a quantity of contiguous component carriers, from the group of component carriers, within the subset of component carriers.

In some cases, the indication of the subset of component carriers is based on an order of resources associated with the group of component carriers. In some cases, the order is a frequency-first order or a time-first order. In some cases, the group of component carriers is the two or more component carriers.

In some examples, the component carrier configuration component 1625 may transmit a configuration message indicating a set of parameters for each of the two or more component carriers, where the set of parameters for each of the two or more component carriers are the same, and where transmitting the DCI is based on transmitting the configuration message. In some examples, the component carrier configuration component 1625 may transmit a configuration message indicating a first set of parameters for a first component carrier of the two or more component carriers, where the first set of parameters for the first component carrier and a set of parameters for remaining component carriers of the two or more component carriers are the same, and where transmitting the DCI is based on transmitting the configuration message.

The feedback reception component 1630 may receive, from the UE, acknowledgement information associated with a set of downlink transmissions from the set of data transmissions, where the acknowledgement information includes a single bit associated with the two or more component carriers, a set of bits each associated with one of the two or more component carriers, or a set of bits each associated with a TTI of one of the two or more component carriers.

In some cases, the DCI schedules the set of data transmissions over the two or more component carriers for a set of TTIs.

In some cases, the two or more component carriers are a first set of component carriers. In some cases, the one or more fields that are common to the first set of component carriers are a first set of one or more fields. In some cases, the set of data transmissions over the first set of component carriers is a first set of data transmissions. In some cases, the DCI includes a second set of one or more fields that are common to a second set of two or more component carriers. In some cases, the DCI schedules a second set of data transmissions over the second set of two or more component carriers.

In some examples, the data transmission component 1620 may transmit or receive the second set of data transmissions over the second set of two or more component carriers based on transmitting the DCI including the second set of one or more fields that are common to the second set of two or more component carriers.

In some cases, the first set of one or more fields and the second set of one or more fields share a field indicating a first parameter for the first set of data transmissions over the first set of component carriers and a second parameter for the second set of data transmissions over the second set of two or more component carriers. In some cases, the first parameter is different from the second parameter.

In some examples, the component carrier configuration component 1625 may transmit a configuration message to the UE indicating a mapping from the shared field to the first parameter and the second parameter. In some cases, the first parameter and the second parameter are FDRA parameters, TDRA parameters, or both. In some cases, a first component carrier of the two or more component carriers has a first subcarrier spacing. In some cases, a second component carrier of the two or more component carriers has a second subcarrier spacing different from the first subcarrier spacing.

Figure 17:
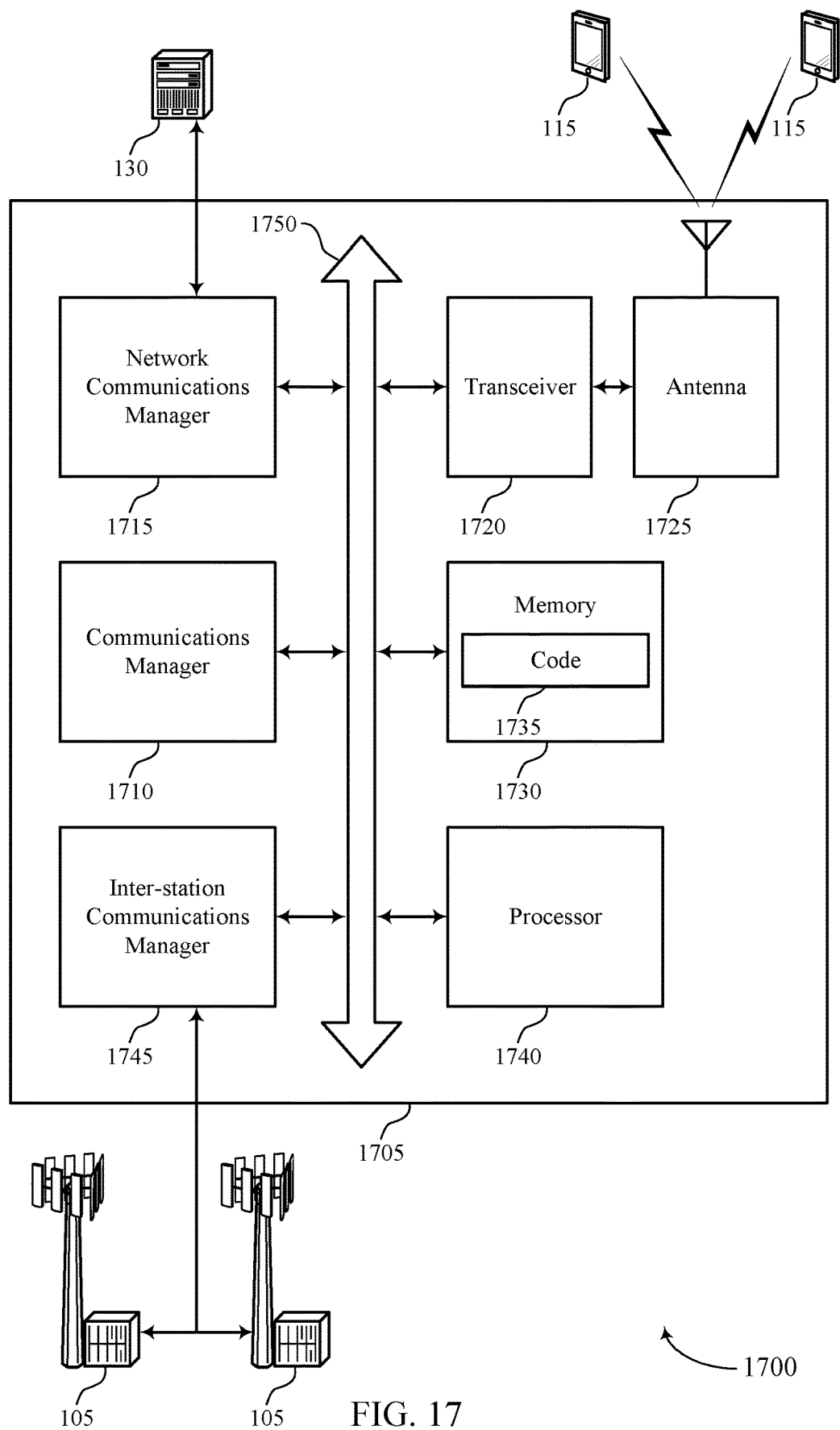
FIG. 17 shows a diagram of a system including a device that supports DCI for scheduling multiple component carriers in accordance with aspects of the present disclosure.

FIG. 17 shows a diagram of a system 1700 including a device 1705 that supports DCI for scheduling multiple component carriers in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may communicate with a UE over a set of component carriers according to a carrier aggregation configuration, transmit, to the UE based on connecting with the UE, DCI including one or more fields that are common to two or more component carriers from the set of component carriers, the DCI scheduling a set of data transmissions over the two or more component carriers, and transmit or receive the set of data transmissions over the scheduled two or more component carriers based on transmitting the DCI.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by at least one processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include a hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting DCI for scheduling multiple component carriers).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
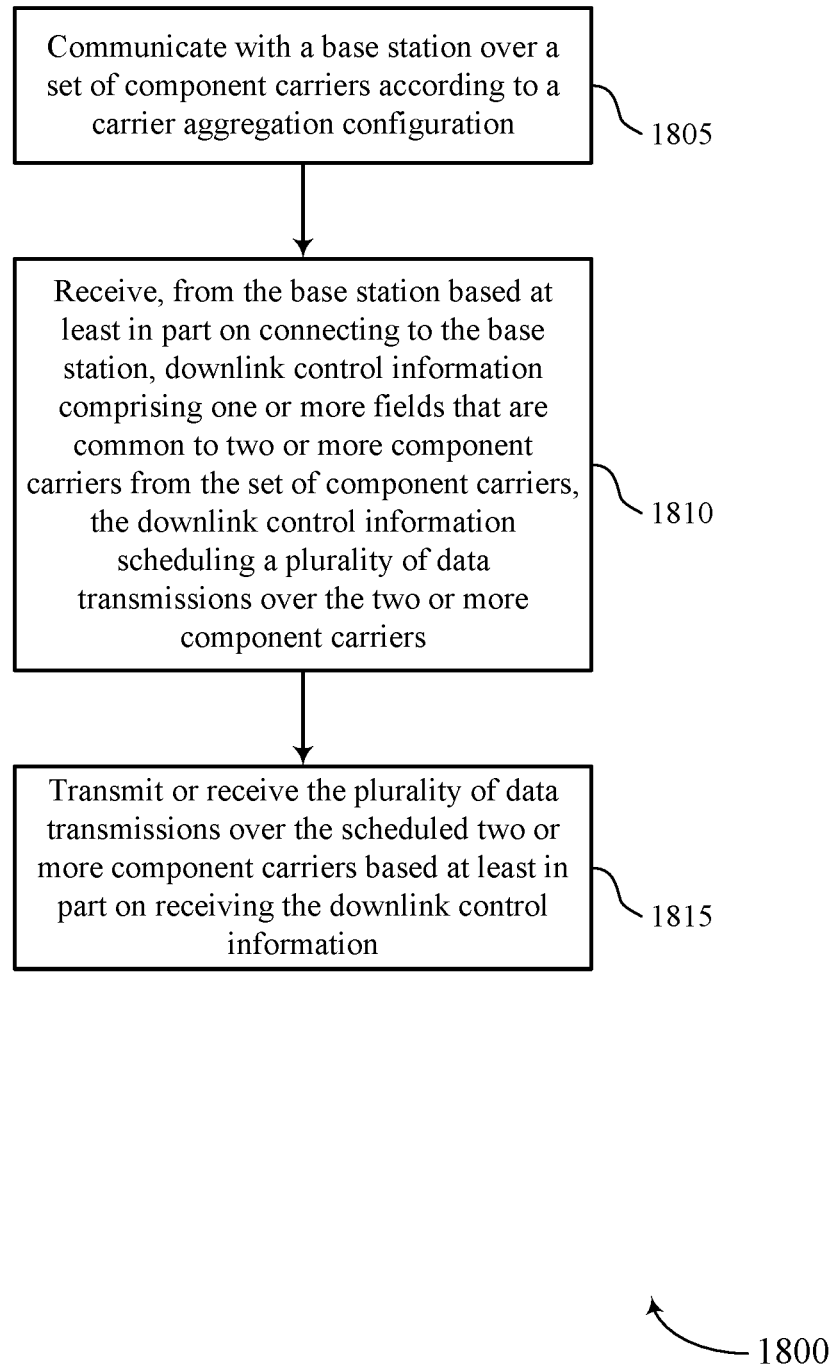
FIGS. 18 through 21 show flowcharts illustrating methods that support DCI for scheduling multiple component carriers in accordance with aspects of the present disclosure.

FIG. 18 shows a flowchart illustrating a method 1800 that supports DCI for scheduling multiple component carriers in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may communicate with a base station over a set of component carriers according to a carrier aggregation configuration. The operations of 1805 may be performed according to the methods described herein. In some examples, aspects of the operations of 1805 may be performed by a communications manager as described with reference to FIGS. 10 through 13.

At 1810, the UE may receive, from the base station based at least in part on connecting to the base station, DCI comprising one or more fields that are common to two or more component carriers from the set of component carriers, the DCI scheduling a plurality of data transmissions over the two or more component carriers. The operations of 1810 may be performed according to the methods described herein. In some examples, aspects of the operations of 1810 may be performed by a DCI reception manager as described with reference to FIGS. 10 through 13.

At 1815, the UE may transmit or receive the plurality of data transmissions over the scheduled two or more component carriers based at least in part on receiving the DCI. The operations of 1815 may be performed according to the methods described herein. In some examples, aspects of the operations of 1815 may be performed by a data transmission manager as described with reference to FIGS. 10 through 13.

Figure 19:
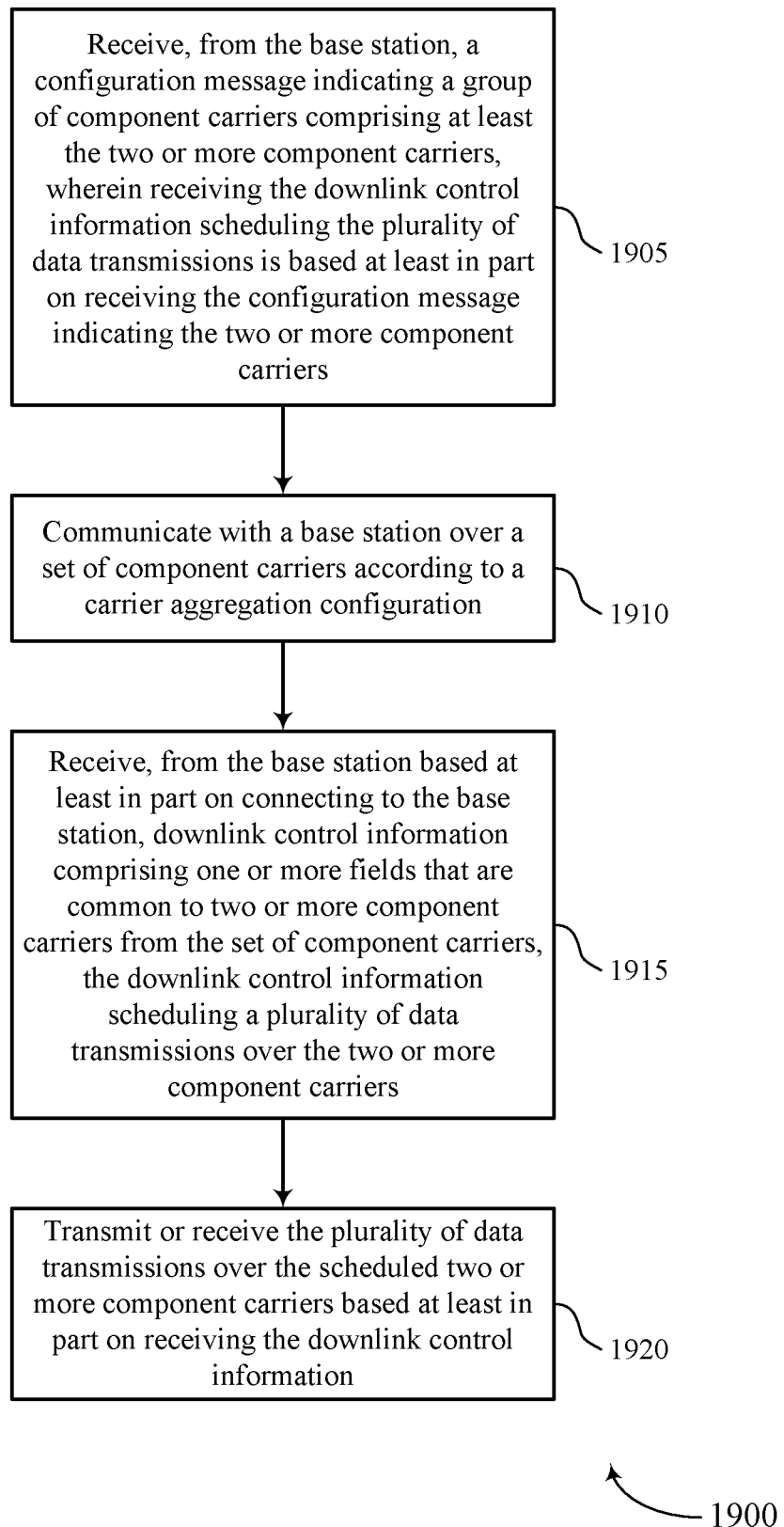

FIG. 19 shows a flowchart illustrating a method 1900 that supports DCI for scheduling multiple component carriers in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may receive, from the base station, a configuration message indicating a group of component carriers comprising at least the two or more component carriers, wherein receiving the DCI scheduling the plurality of data transmissions is based at least in part on receiving the configuration message indicating the two or more component carriers. The operations of 1905 may be performed according to the methods described herein. In some examples, aspects of the operations of 1905 may be performed by a component carrier configuration manager as described with reference to FIGS. 10 through 13.

At 1910, the UE may communicate with a base station over a set of component carriers according to a carrier aggregation configuration. The operations of 1910 may be performed according to the methods described herein. In some examples, aspects of the operations of 1910 may be performed by a communications manager as described with reference to FIGS. 10 through 13.

At 1915, the UE may receive, from the base station based at least in part on connecting to the base station, DCI comprising one or more fields that are common to two or more component carriers from the set of component carriers, the DCI scheduling a plurality of data transmissions over the two or more component carriers. The operations of 1915 may be performed according to the methods described herein. In some examples, aspects of the operations of 1915 may be performed by a DCI reception manager as described with reference to FIGS. 10 through 13.

At 1920, the UE may transmit or receive the plurality of data transmissions over the scheduled two or more component carriers based at least in part on receiving the DCI. The operations of 1920 may be performed according to the methods described herein. In some examples, aspects of the operations of 1920 may be performed by a data transmission manager as described with reference to FIGS. 10 through 13.

Figure 20:
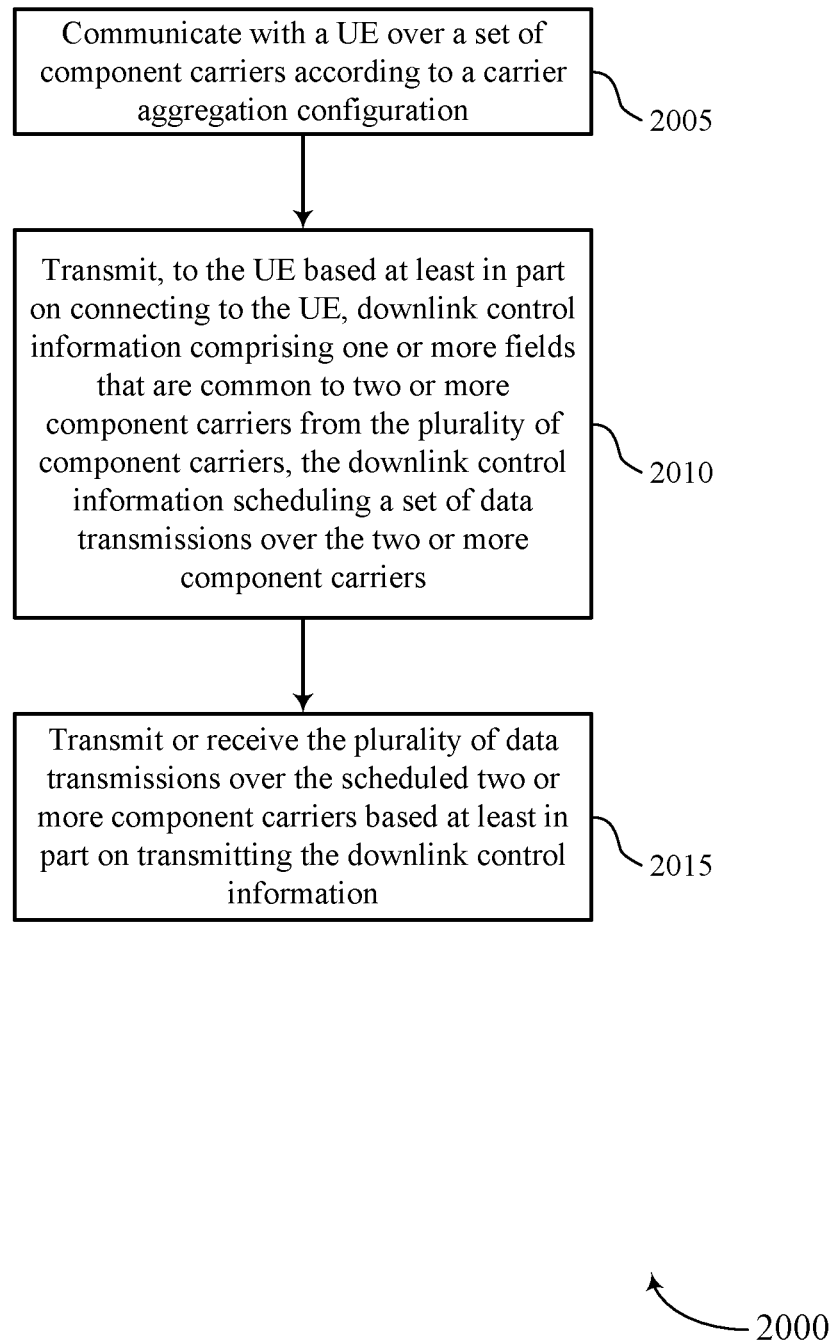

FIG. 20 shows a flowchart illustrating a method 2000 that supports DCI for scheduling multiple component carriers in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may communicate with a UE over a set of component carriers according to a carrier aggregation configuration. The operations of 2005 may be performed according to the methods described herein. In some examples, aspects of the operations of 2005 may be performed by a communications component as described with reference to FIGS. 14 through 17.

At 2010, the base station may transmit, to the UE based at least in part on connecting with the UE, DCI comprising one or more fields that are common to two or more component carriers from the set of component carriers, the DCI scheduling a plurality of data transmissions over the two or more component carriers. The operations of 2010 may be performed according to the methods described herein. In some examples, aspects of the operations of 2010 may be performed by a DCI transmission component as described with reference to FIGS. 14 through 17.

At 2015, the base station may transmit or receive the plurality of data transmissions over the scheduled two or more component carriers based at least in part on transmitting the DCI. The operations of 2015 may be performed according to the methods described herein. In some examples, aspects of the operations of 2015 may be performed by a data transmission component as described with reference to FIGS. 14 through 17.

Figure 21:
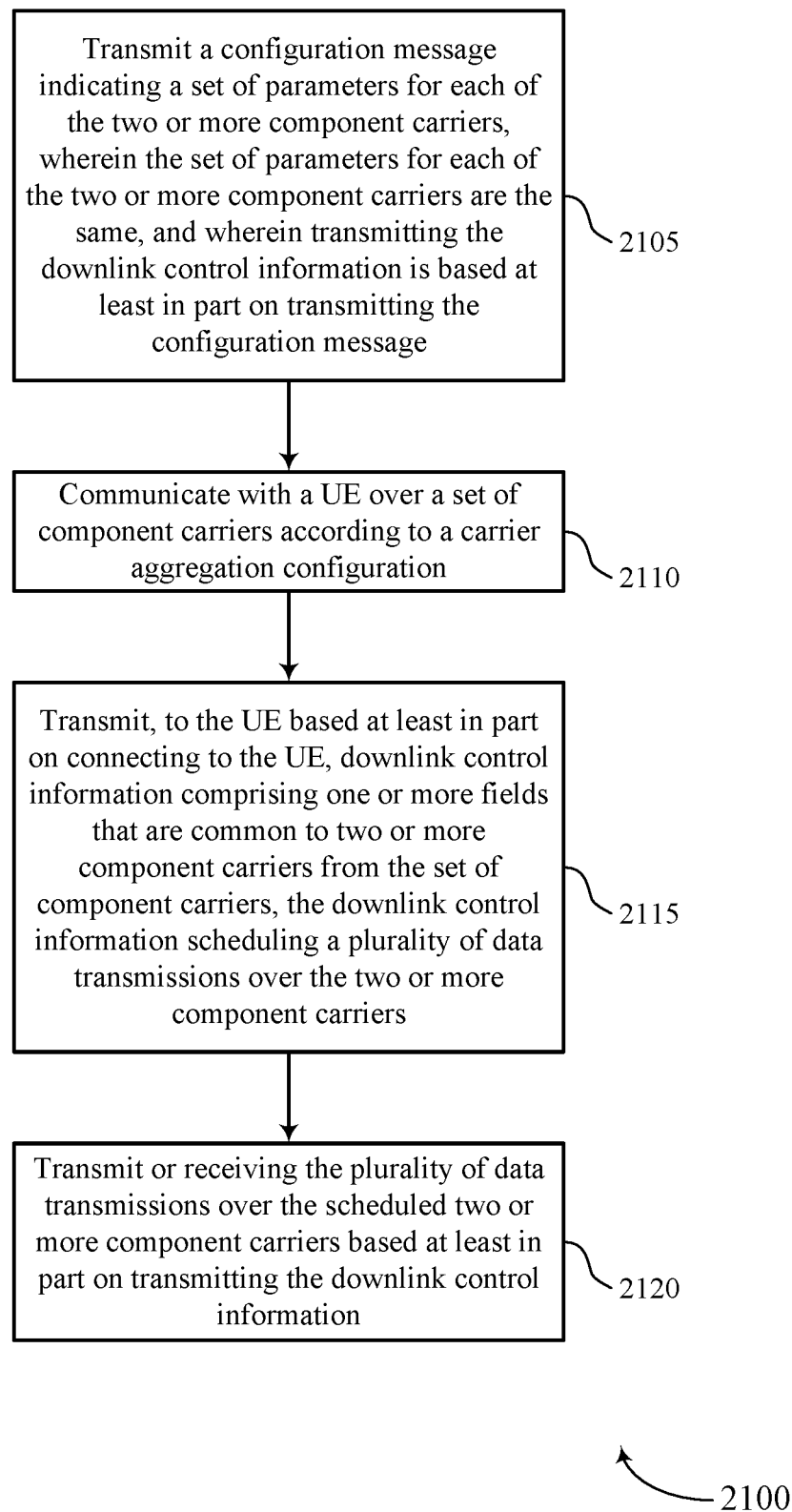

FIG. 21 shows a flowchart illustrating a method 2100 that supports DCI for scheduling multiple component carriers in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may transmit a configuration message indicating a set of parameters for each of the two or more component carriers, wherein the set of parameters for each of the two or more component carriers are the same, and wherein transmitting the DCI is based at least in part on transmitting the configuration message. The operations of 2105 may be performed according to the methods described herein. In some examples, aspects of the operations of 2105 may be performed by a component carrier configuration component as described with reference to FIGS. 14 through 17.

At 2110, the base station may communicate with a UE over a set of component carriers according to a carrier aggregation configuration. The operations of 2110 may be performed according to the methods described herein. In some examples, aspects of the operations of 2110 may be performed by a communications component as described with reference to FIGS. 14 through 17.

At 2115, the base station may transmit, to the UE based at least in part on connecting with the UE, DCI comprising one or more fields that are common to two or more component carriers from the set of component carriers, the DCI scheduling a plurality of data transmissions over the two or more component carriers. The operations of 2115 may be performed according to the methods described herein. In some examples, aspects of the operations of 2115 may be performed by a DCI transmission component as described with reference to FIGS. 14 through 17.

At 2120, the base station may transmit or receive the plurality of data transmissions over the scheduled two or more component carriers based at least in part on transmitting the DCI. The operations of 2120 may be performed according to the methods described herein. In some examples, aspects of the operations of 2120 may be performed by a data transmission component as described with reference to FIGS. 14 through 17.

The following provides an overview of aspects of the present disclosure:

Aspect 1: A method for wireless communication, comprising: communicating with a base station over a set of component carriers according to a carrier aggregation configuration; receiving, from the base station based at least in part on connecting to the base station, downlink control information comprising one or more fields that are common to two or more component carriers from the set of component carriers, the downlink control information scheduling a plurality of data transmissions over the two or more component carriers; and transmitting or receiving the plurality of data transmissions over the scheduled two or more component carriers based at least in part on receiving the downlink control information.

Aspect 2: The method of aspect 1, further comprising: receiving, from the base station, a configuration message indicating a group of component carriers comprising at least the two or more component carriers, wherein receiving the downlink control information scheduling the plurality of data transmissions is based at least in part on receiving the configuration message indicating the two or more component carriers.

Aspect 3: The method of aspect 2, wherein receiving the downlink control information comprises: receiving an indication of a subset of component carriers from the group of component carriers, the subset of component carriers comprising the two or more component carriers, wherein transmitting or receiving the plurality of data transmissions over the two or more component carriers is based at least in part on receiving the indication of the subset of component carriers.

Aspect 4: The method of aspect 3, wherein receiving the indication of the subset of component carriers comprises: receiving a bitmap indicating the two or more component carriers from the group of component carriers.

Aspect 5: The method of any of aspects 3 through 4, wherein receiving the indication of the subset of component carriers comprises: receiving an indication of a first component carrier, from the group of component carriers, within the subset of component carriers; and receiving an indication of a quantity of contiguous component carriers, from the group of component carriers, within the subset of component carriers.

Aspect 6: The method of any of aspects 3 through 5, wherein the indication of the subset of component carriers is based at least in part on an order of resources associated with the group of component carriers; and the order is a frequency-first order or a time-first order.

Aspect 7: The method of any of aspects 2 through 6, wherein the group of component carriers is the two or more component carriers.

Aspect 8: The method of any of aspects 1 through 7, further comprising: receiving a configuration message indicating a set of parameters for each of the two or more component carriers, wherein the set of parameters for each of the two or more component carriers are the same, and wherein receiving the downlink control information is based at least in part on receiving the configuration message.

Aspect 9: The method of any of aspects 1 through 8, further comprising: receiving a configuration message indicating a first set of parameters for a first component carrier of the two or more component carriers; and identifying a set of parameters for remaining component carriers of the two or more component carriers based at least in part on the first set of parameters, wherein the first set of parameters for the first component carrier and the set of parameters for the remaining component carriers are the same, and wherein receiving the downlink control information is based at least in part on receiving the configuration message.

Aspect 10: The method of any of aspects 1 through 9, further comprising: attempting to decode a set of downlink transmissions of the plurality of data transmissions; and transmitting, to the base station, acknowledgement information associated with the set of downlink transmissions, wherein the acknowledgement information comprises a single bit associated with the two or more component carriers, a set of bits each associated with one of the two or more component carriers, or a set of bits each associated with a transmission time interval of one of the two or more component carriers.

Aspect 11: The method of any of aspects 1 through 10, wherein the downlink control information schedules the plurality of data transmissions over the two or more component carriers for a plurality of transmission time intervals.

Aspect 12: The method of aspect 11, further comprising: identifying, based at least in part on receiving the downlink control information, a first identifier for a first hybrid automatic repeat request associated with the plurality of data transmissions during a first transmission time interval of the plurality of transmission time intervals; and incrementing the first identifier to generate a second identifier for a second hybrid automatic repeat request associated with the plurality of data transmissions during a second transmission time interval of the plurality of transmission time intervals.

Aspect 13: The method of any of aspects 11 through 12, further comprising: identifying, based at least in part on receiving the downlink control information, a first timing parameter for transmitting a first hybrid automatic repeat request associated with the plurality of data transmissions during a first transmission time interval of the plurality of transmission time intervals; and incrementing the first timing parameter to generate a second timing parameter for transmitting a second hybrid automatic repeat request associated with the plurality of data transmissions during a second transmission time interval of the plurality of transmission time intervals.

Aspect 14: The method of any of aspects 1 through 13, wherein the two or more component carriers are a first set of component carriers; the one or more fields that are common to the first set of component carriers are a first set of one or more fields; the plurality of data transmissions over the first set of component carriers is a first plurality of data transmissions; the downlink control information comprises a second set of one or more fields that are common to a second set of two or more component carriers; and the downlink control information schedules a second plurality of data transmissions over the second set of two or more component carriers.

Aspect 15: The method of aspect 14, further comprising: transmitting or receiving the second plurality of data transmissions over the second set of two or more component carriers based at least in part on receiving the downlink control information comprising the second set of one or more fields that are common to the second set of two or more component carriers.

Aspect 16: The method of any of aspects 14 through 15, wherein the first set of one or more fields and the second set of one or more fields share a field indicating a first parameter for the first plurality of data transmissions over the first set of component carriers and a second parameter for the second plurality of data transmissions over the second set of two or more component carriers; and the first parameter is different from the second parameter.

Aspect 17: The method of aspect 16, further comprising: receiving a configuration message from the base station indicating a mapping from the shared field to the first parameter and the second parameter.

Aspect 18: The method of any of aspects 16 through 17, wherein the first parameter and the second parameter are frequency domain resource allocation parameters, time domain resource allocation parameters, or both.

Aspect 19: The method of any of aspects 1 through 18, wherein a first component carrier of the two or more component carriers has a first subcarrier spacing; and a second component carrier of the two or more component carriers has a second subcarrier spacing different from the first subcarrier spacing.

Aspect 20: A method for wireless communication, comprising: communicating with a UE over a set of component carriers according to a carrier aggregation configuration; transmitting, to the UE based at least in part on connecting with the UE, downlink control information comprising one or more fields that are common to two or more component carriers from the set of component carriers, the downlink control information scheduling a plurality of data transmissions over the two or more component carriers; and transmitting or receiving the plurality of data transmissions over the scheduled two or more component carriers based at least in part on transmitting the downlink control information.

Aspect 21: The method of aspect 20, further comprising: transmitting, to the UE, a configuration message indicating a group of component carriers comprising at least the two or more component carriers, wherein transmitting the downlink control information scheduling the plurality of data transmissions is based at least in part on transmitting the configuration message indicating the two or more component carriers.

Aspect 22: The method of aspect 21, wherein transmitting the downlink control information comprises: transmitting an indication of a subset of component carriers from the group of component carriers, the subset of component carriers comprising the two or more component carriers, wherein transmitting or receiving the plurality of data transmissions over the two or more component carriers is based at least in part on transmitting the indication of the subset of component carriers.

Aspect 23: The method of aspect 22, wherein transmitting the indication of the subset of component carriers comprises: transmitting a bitmap indicating the two or more component carriers from the group of component carriers.

Aspect 24: The method of any of aspects 22 through 23, wherein transmitting the indication of the subset of component carriers comprises: transmitting an indication of a first component carrier, from the group of component carriers, within the subset of component carriers; and transmitting an indication of a quantity of contiguous component carriers, from the group of component carriers, within the subset of component carriers.

Aspect 25: The method of any of aspects 22 through 24, wherein the indication of the subset of component carriers is based at least in part on an order of resources associated with the group of component carriers; and the order is a frequency-first order or a time-first order.

Aspect 26: The method of any of aspects 21 through 25, wherein the group of component carriers is the two or more component carriers.

Aspect 27: The method of any of aspects 20 through 26, further comprising: transmitting a configuration message indicating a set of parameters for each of the two or more component carriers, wherein the set of parameters for each of the two or more component carriers are the same, and wherein transmitting the downlink control information is based at least in part on transmitting the configuration message.

Aspect 28: The method of any of aspects 20 through 27, further comprising: transmitting a configuration message indicating a first set of parameters for a first component carrier of the two or more component carriers, wherein the first set of parameters for the first component carrier and a set of parameters for remaining component carriers of the two or more component carriers are the same, and wherein transmitting the downlink control information is based at least in part on transmitting the configuration message.

Aspect 29: The method of any of aspects 20 through 28, further comprising: receiving, from the UE, acknowledgement information associated with a set of downlink transmissions from the plurality of data transmissions, wherein the acknowledgement information comprises a single bit associated with the two or more component carriers, a set of bits each associated with one of the two or more component carriers, or a set of bits each associated with a transmission time interval of one of the two or more component carriers.

Aspect 30: The method of any of aspects 20 through 29, wherein the downlink control information schedules the plurality of data transmissions over the two or more component carriers for a plurality of transmission time intervals.

Aspect 31: The method of any of aspects 20 through 30, wherein the two or more component carriers are a first set of component carriers; the one or more fields that are common to the first set of component carriers are a first set of one or more fields; the plurality of data transmissions over the first set of component carriers is a first plurality of data transmissions; the downlink control information comprises a second set of one or more fields that are common to a second set of two or more component carriers; and the downlink control information schedules a second plurality of data transmissions over the second set of two or more component carriers.

Aspect 32: The method of aspect 31, further comprising: transmitting or receiving the second plurality of data transmissions over the second set of two or more component carriers based at least in part on transmitting the downlink control information comprising the second set of one or more fields that are common to the second set of two or more component carriers.

Aspect 33: The method of any of aspects 31 through 32, wherein the first set of one or more fields and the second set of one or more fields share a field indicating a first parameter for the first plurality of data transmissions over the first set of component carriers and a second parameter for the second plurality of data transmissions over the second set of two or more component carriers; and the first parameter is different from the second parameter.

Aspect 34: The method of aspect 33, further comprising: transmitting a configuration message to the UE indicating a mapping from the shared field to the first parameter and the second parameter.

Aspect 35: The method of any of aspects 33 through 34, wherein the first parameter and the second parameter are frequency domain resource allocation parameters, time domain resource allocation parameters, or both.

Aspect 36: The method of any of aspects 20 through 35, wherein a first component carrier of the two or more component carriers has a first subcarrier spacing; and a second component carrier of the two or more component carriers has a second subcarrier spacing different from the first subcarrier spacing.

Aspect 37: An apparatus for wireless communication, comprising at least one processor; memory coupled with the at least one processor; and instructions stored in the memory and executable by the at least one processor to cause the apparatus to perform a method of any of aspects 1 through 19.

Aspect 38: An apparatus for wireless communication, comprising at least one means for performing a method of any of aspects 1 through 19.

Aspect 39: A non-transitory computer-readable medium storing code for wireless communication, the code comprising instructions executable by at least one processor to perform a method of any of aspects 1 through 19.

Aspect 40: An apparatus for wireless communication, comprising at least one processor; memory coupled with the at least one processor; and instructions stored in the memory and executable by the at least one processor to cause the apparatus to perform a method of any of aspects 20 through 36.

Aspect 41: An apparatus for wireless communication, comprising at least one means for performing a method of any of aspects 20 through 36.

Aspect 42: A non-transitory computer-readable medium storing code for wireless communication, the code comprising instructions executable by at least one processor to perform a method of any of aspects 20 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
communicating with a network entity over a set of component carriers according to a carrier aggregation configuration;
receiving, from the network entity based at least in part on connecting to the network entity, downlink control information comprising one or more fields that are common to two or more component carriers from the set of component carriers, the downlink control information scheduling a plurality of data transmissions over the two or more component carriers; and
transmitting or receiving the plurality of data transmissions over the scheduled two or more component carriers based at least in part on receiving the downlink control information.

2. The method of claim 1, further comprising:
receiving, from the network entity, a configuration message indicating a group of component carriers comprising at least the two or more component carriers, wherein receiving the downlink control information scheduling the plurality of data transmissions is based at least in part on receiving the configuration message indicating the two or more component carriers.

3. The method of claim 2, wherein receiving the downlink control information comprises:
receiving an indication of a subset of component carriers from the group of component carriers, the subset of component carriers comprising the two or more component carriers, wherein transmitting or receiving the plurality of data transmissions over the two or more component carriers is based at least in part on receiving the indication of the subset of component carriers.

4. The method of claim 3, wherein receiving the indication of the subset of component carriers comprises:
receiving a bitmap indicating the two or more component carriers from the group of component carriers.

5. The method of claim 1, further comprising:
receiving a configuration message indicating a set of parameters for each of the two or more component carriers, wherein the set of parameters for each of the two or more component carriers are the same, and wherein receiving the downlink control information is based at least in part on receiving the configuration message.

6. The method of claim 1, further comprising:
receiving a configuration message indicating a first set of parameters for a first component carrier of the two or more component carriers; and
identifying a set of parameters for remaining component carriers of the two or more component carriers based at least in part on the first set of parameters, wherein the first set of parameters for the first component carrier and the set of parameters for the remaining component carriers are the same, and wherein receiving the downlink control information is based at least in part on receiving the configuration message.

7. The method of claim 1, further comprising:
attempting to decode a set of downlink transmissions of the plurality of data transmissions; and
transmitting, to the network entity, acknowledgement information associated with the set of downlink transmissions, wherein the acknowledgement information comprises a single bit associated with the two or more component carriers, a set of bits each associated with one of the two or more component carriers, or a set of bits each associated with a transmission time interval of one of the two or more component carriers.

8. The method of claim 1, wherein the downlink control information schedules the plurality of data transmissions over the two or more component carriers for a plurality of transmission time intervals, the method further comprising:
identifying, based at least in part on receiving the downlink control information, a first identifier for a first hybrid automatic repeat request associated with the plurality of data transmissions during a first transmission time interval of the plurality of transmission time intervals; and
incrementing the first identifier to generate a second identifier for a second hybrid automatic repeat request associated with the plurality of data transmissions during a second transmission time interval of the plurality of transmission time intervals.

9. The method of claim 1, wherein the downlink control information schedules the plurality of data transmissions over the two or more component carriers for a plurality of transmission time intervals, the method further comprising:
identifying, based at least in part on receiving the downlink control information, a first timing parameter for transmitting a first hybrid automatic repeat request associated with the plurality of data transmissions during a first transmission time interval of the plurality of transmission time intervals; and
incrementing the first timing parameter to generate a second timing parameter for transmitting a second hybrid automatic repeat request associated with the plurality of data transmissions during a second transmission time interval of the plurality of transmission time intervals.

10. The method of claim 1, wherein:
the two or more component carriers are a first set of component carriers;
the one or more fields that are common to the first set of component carriers are a first set of one or more fields;

the plurality of data transmissions over the first set of component carriers is a first plurality of data transmissions;

the downlink control information comprises a second set of one or more fields that are common to a second set of two or more component carriers; and the downlink control information schedules a second plurality of data transmissions over the second set of two or more component carriers.

11. A method for wireless communication, comprising:

communicating with a user equipment (UE) over a set of component carriers according to a carrier aggregation configuration;

transmitting, to the UE based at least in part on connecting with the UE, downlink control information comprising one or more fields that are common to two or more component carriers from the set of component carriers, the downlink control information scheduling a plurality of data transmissions over the two or more component carriers; and transmitting or receiving the plurality of data transmissions over the scheduled two or more component carriers based at least in part on transmitting the downlink control information.

12. The method of claim 11, further comprising:

transmitting, to the UE, a configuration message indicating a group of component carriers comprising at least the two or more component carriers, wherein transmitting the downlink control information scheduling the plurality of data transmissions is based at least in part on transmitting the configuration message indicating the two or more component carriers.

13. The method of claim 12, wherein transmitting the downlink control information comprises:

transmitting an indication of a subset of component carriers from the group of component carriers, the subset of component carriers comprising the two or more component carriers, wherein transmitting or receiving the plurality of data transmissions over the two or more component carriers is based at least in part on transmitting the indication of the subset of component carriers.

14. The method of claim 13, wherein transmitting the indication of the subset of component carriers comprises:

transmitting a bitmap indicating the two or more component carriers from the group of component carriers.

15. The method of claim 13, wherein transmitting the indication of the subset of component carriers comprises:

transmitting an indication of a first component carrier, from the group of component carriers, within the subset of component carriers; and transmitting an indication of a quantity of contiguous component carriers, from the group of component carriers, within the subset of component carriers.

16. An apparatus for wireless communication, comprising:

at least one processor, and memory coupled with the at least one processor, the memory storing instructions for the at least one processor to cause the apparatus to:

communicate with a network entity over a set of component carriers according to a carrier aggregation configuration;

receive, from the network entity based at least in part on connecting to the network entity, downlink control information comprising one or more fields that are common to two or more component carriers from the set of component carriers, the downlink control information scheduling a plurality of data transmissions over the two or more component carriers; and transmit or receive the plurality of data transmissions over the scheduled two or more component carriers based at least in part on receiving the downlink control information.

17. The apparatus of claim 16, wherein the instructions are further for the at least one processor to cause the apparatus to:

receive, from the network entity, a configuration message indicating a group of component carriers comprising at least the two or more component carriers, wherein receiving the downlink control information scheduling the plurality of data transmissions is based at least in part on receiving the configuration message indicating the two or more component carriers.

18. The apparatus of claim 17, wherein the instructions to receive the downlink control information are further for the at least one processor to cause the apparatus to:

receive an indication of a subset of component carriers from the group of component carriers, the subset of component carriers comprising the two or more component carriers, wherein transmitting or receiving the plurality of data transmissions over the two or more component carriers is based at least in part on receiving the indication of the subset of component carriers.

19. The apparatus of claim 18, wherein the instructions to receive the indication of the subset of component carriers are further for by the at least one processor to cause the apparatus to:

receive a bitmap indicating the two or more component carriers from the group of component carriers.

20. The apparatus of claim 16, wherein the instructions are further for the at least one processor to cause the apparatus to:

receive a configuration message indicating a set of parameters for each of the two or more component carriers, wherein the set of parameters for each of the two or more component carriers are the same, and wherein receiving the downlink control information is based at least in part on receiving the configuration message.

21. The apparatus of claim 16, wherein the instructions are further for the at least one processor to cause the apparatus to:

receive a configuration message indicating a first set of parameters for a first component carrier of the two or more component carriers; and identify a set of parameters for remaining component carriers of the two or more component carriers based at least in part on the first set of parameters, wherein the first set of parameters for the first component carrier and the set of parameters for the remaining component carriers are the same, and wherein receiving the downlink control information is based at least in part on receiving the configuration message.

22. The apparatus of claim 16, wherein the instructions are further for the at least one processor to cause the apparatus to:

attempt to decode a set of downlink transmissions of the plurality of data transmissions; and transmit, to the network entity, acknowledgement information associated with the set of downlink transmissions, wherein the acknowledgement information comprises a single bit associated with the two or more component carriers, a set of bits each associated with one of the two or more component carriers, or a set of bits each associated with a transmission time interval of one of the two or more component carriers.

23. The apparatus of claim 16, wherein the downlink control information schedules the plurality of data transmissions over the two or more component carriers for a plurality of transmission time intervals, the instructions are further for the at least one processor to cause the apparatus to:
identify, based at least in part on receiving the downlink control information, a first identifier for a first hybrid automatic repeat request associated with the plurality of data transmissions during a first transmission time interval of the plurality of transmission time intervals; and
increment the first identifier to generate a second identifier for a second hybrid automatic repeat request associated with the plurality of data transmissions during a second transmission time interval of the plurality of transmission time intervals.

24. The apparatus of claim 16, wherein the downlink control information schedules the plurality of data transmissions over the two or more component carriers for a plurality of transmission time intervals, the instructions are further for the at least one processor to cause the apparatus to:
identify, based at least in part on receiving the downlink control information, a first timing parameter for transmitting a first hybrid automatic repeat request associated with the plurality of data transmissions during a first transmission time interval of the plurality of transmission time intervals; and
increment the first timing parameter to generate a second timing parameter for transmitting a second hybrid automatic repeat request associated with the plurality of data transmissions during a second transmission time interval of the plurality of transmission time intervals.

25. The apparatus of claim 16, wherein:
the two or more component carriers are a first set of component carriers;
the one or more fields that are common to the first set of component carriers are a first set of one or more fields;
the plurality of data transmissions over the first set of component carriers is a first plurality of data transmissions;
the downlink control information comprises a second set of one or more fields that are common to a second set of two or more component carriers; and
the downlink control information schedules a second plurality of data transmissions over the second set of two or more component carriers.

26. An apparatus for wireless communication, comprising:
at least one processor,
and memory coupled with the at least one processor, the memory storing instructions for the at least one processor to cause the apparatus to:
communicate with a user equipment (UE) over a set of component carriers according to a carrier aggregation configuration;
transmit, to the UE based at least in part on connecting with the UE, downlink control information comprising one or more fields that are common to two or more component carriers from the set of component carriers, the downlink control information scheduling a plurality of data transmissions over the two or more component carriers; and
transmit or receive the plurality of data transmissions over the scheduled two or more component carriers based at least in part on transmitting the downlink control information.

27. The apparatus of claim 26, wherein the instructions are further for the at least one processor to cause the apparatus to:
transmit, to the UE, a configuration message indicating a group of component carriers comprising at least the two or more component carriers, wherein transmitting the downlink control information scheduling the plurality of data transmissions is based at least in part on transmitting the configuration message indicating the two or more component carriers.

28. The apparatus of claim 27, wherein the instructions to transmit the downlink control information are further for the at least one processor to cause the apparatus to:
transmit an indication of a subset of component carriers from the group of component carriers, the subset of component carriers comprising the two or more component carriers, wherein transmitting or receiving the plurality of data transmissions over the two or more component carriers is based at least in part on transmitting the indication of the subset of component carriers.

29. The apparatus of claim 28, wherein the instructions to transmit the indication of the subset of component carriers are further for the at least one processor to cause the apparatus to:
transmit a bitmap indicating the two or more component carriers from the group of component carriers.

30. The apparatus of claim 28, wherein the instructions to transmit the indication of the subset of component carriers are further for the at least one processor to cause the apparatus to:
transmit an indication of a first component carrier, from the group of component carriers, within the subset of component carriers; and
transmit an indication of a quantity of contiguous component carriers, from the group of component carriers, within the subset of component carriers.

* * * * *